US007383115B2

(12) United States Patent
Tabata et al.

(10) Patent No.: US 7,383,115 B2
(45) Date of Patent: Jun. 3, 2008

(54) VEHICLE DECELERATION CONTROL APPARATUS

(75) Inventors: Atsushi Tabata, Okazaki (JP); Kazutoshi Nozaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 280 days.

(21) Appl. No.: 11/195,776

(22) Filed: Aug. 3, 2005

(65) Prior Publication Data

US 2006/0064225 A1    Mar. 23, 2006

(30) Foreign Application Priority Data

| Aug. 30, 2004 | (JP) | ............................. 2004-250489 |
| Aug. 30, 2004 | (JP) | ............................. 2004-250490 |
| Sep. 10, 2004 | (JP) | ............................. 2004-264068 |
| Sep. 13, 2004 | (JP) | ............................. 2004-265621 |
| Oct. 27, 2004 | (JP) | ............................. 2004-313167 |
| Nov. 12, 2004 | (JP) | ............................. 2004-329199 |
| Nov. 12, 2004 | (JP) | ............................. 2004-329200 |

(51) Int. Cl.
  *F16H 59/48*  (2006.01)
(52) U.S. Cl. ......................................... 701/96; 342/70
(58) Field of Classification Search .................. 701/93, 701/96, 65, 54; 342/70, 71, 72; 340/903; 477/47
  See application file for complete search history.

(56) References Cited

U.S. PATENT DOCUMENTS 5,215,159 A * 6/1993 Nishida ...................... 180/179
5,575,542 A * 11/1996 Tanaka et al. ............... 303/125
5,730,680 A * 3/1998 Toukura ........................ 477/46
6,161,073 A * 12/2000 Tange et al. ................... 701/96
6,223,118 B1 * 4/2001 Kobayashi et al. ............ 701/96
6,401,024 B1 * 6/2002 Tange et al. ................... 701/96
6,739,677 B2 * 5/2004 Tazoe et al. .................. 303/152
6,957,138 B2 * 10/2005 Kondo et al. .................. 701/96

FOREIGN PATENT DOCUMENTS

| JP | 9-264408 A | 10/1997 |
| JP | 10-141483 A | 5/1998 |
| JP | 2920267 B2 | 4/1999 |
| JP | 2966194 B2 | 8/1999 |
| JP | 2000-245016 A | 9/2000 |
| JP | A-2002-257226 | 9/2002 |
| JP | 2002-349687 A | 12/2002 |
| JP | 2003-097689 A | 4/2003 |

* cited by examiner

*Primary Examiner*—Dalena Tran
(74) *Attorney, Agent, or Firm*—Oliff & Berridge, PLC

(57) ABSTRACT

A deceleration control apparatus for controlling a deceleration value of a vehicle, including a plurality of deceleration-value setting devices, a target-deceleration-value control portion operable to change a target deceleration value of the vehicle according to an operation of each of the deceleration-value setting devices, and a brake control portion operable to control a braking force to be applied to the vehicle, according to the target deceleration value changed by the target-deceleration-value control portion, wherein the target-deceleration-value control portion is operable to successively change the target deceleration value of the vehicle in response to successive operations of one and another of the plurality of deceleration-value setting devices such that the target deceleration value changed according to the operation of the above-indicated one deceleration-value setting device is subsequently changed according to the operation of the above-indicated another deceleration-value setting device.

18 Claims, 13 Drawing Sheets

|  | C1 | C2 | C3 | C4 | B1 | B2 |
|---|---|---|---|---|---|---|
| P |  |  |  |  |  |  |
| Rev1 |  |  | ○ |  |  | ○ |
| Rev2 |  |  |  | ○ |  | ○ |
| N |  |  |  |  |  |  |
| 1st | ○ |  |  |  |  | ○ |
| 2nd | ○ |  |  | ○ |  |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |

FIG.5

| MODES OF OPERATION | C i | ENG | MG1 | MG2 |
|---|---|---|---|---|
| ENGINE DRIVE MODE | ○ | ○ | (REGENERATIVE TORQUE CONTROL) | × |
| ENGINE+MOTOR DRIVE NODE | ○ | ○ | × | DRIVE TORQUE CONTROL |
| MOTOR DRIVE MODE | × | △ | (REGENERATIVE TORQUE CONTROL) | DRIVE TORQUE CONTROL |
| DECELERATION CONTROL MODE | ○ | × | (DRIVE TORQUE CONTROL/ REGENERATIVE TORQUE CONTROL) | DRIVE TORQUE CONTROL/ REGENERATIVE TORQUE CONTROL |

| SHIFT RANGE | GEAR POSITIONS AVAILABLE |
|---|---|
| D | 1,2,3,4,5,6,7,8 |
| 7 | 1,2,3,4,5,6,7 |
| 6 | 1,2,3,4,5,6 |
| 5 | 1,2,3,4,5 |
| 4 | 1,2,3,4 |
| 3 | 1,2,3 |
| 2 | 1,2 |
| L | 1 |

SHIFT-UP ↑
↓ SHIFT-DOWN

VEHICLE DECELERATION CONTROL APPARATUS

This application is based on Japanese Patent Application Nos. 2004-250489 and 2004-250490 both filed August 30, No. 2004-264068 filed Sep. 10, 2004, No. 2004-265621 filed Sep. 13, 2004, No. 2004-313167 filed Oct. 27, 2004, and Nos. 2004-329199 and 2004-329200 filed Nov. 12, 2004, the contents of which are incorporated hereinto by reference.

BACKGROUND OF THE INVENTION

1. Field of the Invention

The present invention relates in general to an apparatus for controlling a deceleration value of a vehicle, and more particularly to techniques for easy setting of a plurality of vehicle deceleration-value setting devices.

2. Discussion of Related Art

There is known a vehicle deceleration control apparatus including (a) a target-deceleration-value control portion operable to increase or reduce a target deceleration value of a vehicle according to an operation of a deceleration-value setting device, and (b) a brake control portion operable to control a braking force of the vehicle according to the target deceleration value set by the deceleration-value setting device. JP-2000-245016A discloses an example of this type of vehicle deceleration control apparatus, wherein a shift lever has an "E" position, and is operable from this "E" position to a "Decel" position for increasing the target deceleration value of the vehicle and a "Can-Decel" position for reducing the target deceleration value, so that a shifting action of an automatic transmission of the vehicle and/or a vehicle drive torque or regenerative torque of an electric motor of the vehicle is/are controlled so as to control the vehicle braking force according to the target deceleration value set by operating the shift lever.

The vehicle deceleration apparatus disclosed in the above-identified publication further includes a "Decel" switch and a "Can-Decel switch" which are provided on a steering wheel of the vehicle and which correspond to the "Decel" and "Can-Decel" positions of the shift lever. The target deceleration value of the vehicle can be controlled by operating the "Decel" and "Can-Decel" switches as well as by operating the shift lever from the "E" position to the "Decel" and "Can-Decel" positions. Although the provision of these "Decel" and "Can-Decel" switches improves ease of setting of the target deceleration value, the vehicle deceleration control apparatus has a risk of a problem in the setting of the target deceleration value when the shift lever and the "Decel" and "Can-Decel" switches are operated independently of each other. The publication is silent on the relationship between the target deceleration value set by operation of the shift lever and that set by the switches on the steering wheel.

SUMMARY OF THE INVENTION

It is therefore an object of the present invention to provide a vehicle deceleration control apparatus which includes a plurality of deceleration-value setting devices and which facilitates the setting of the target deceleration value of the vehicle.

The above object may be achieved according to any one of the following modes of this invention. It is to be understood that the present invention is not limited to the technical features or any combinations thereof which will be described for illustrative purpose only. It is to be understood that a plurality of elements or features included in any one of the following modes of the invention are not necessarily provided all together, and that the invention may be embodied without some of the elements or features described with respect to the same mode.

(1) A deceleration control apparatus for controlling a deceleration value of a vehicle, comprising a target-deceleration-value control portion operable to change a target deceleration value of the vehicle according to an operation of deceleration-value setting means, and a brake control portion operable to control a braking force to be applied to the vehicle, according to the target deceleration value changed by the target-deceleration-value control portion, the deceleration control apparatus being characterized in that the deceleration-value setting means consists of a plurality of deceleration-value setting devices, and the target-deceleration-value control portion is operable to successively change the target deceleration value of the vehicle in response to successive operations of one and another of the plurality of deceleration-value setting devices such that the target deceleration value changed according to the operation of the above-indicated one deceleration-value setting device is subsequently changed according to the operation of the above-indicated another deceleration-value setting device.

In the deceleration control apparatus according to the above-described mode (1) of this invention, the target-deceleration-value control portion is arranged to successively change the target deceleration value of the vehicle in response to successive operations of selected one and another of the plurality of deceleration-value setting devices such that the target deceleration value changed according to the operation of the above-indicated one deceleration-value setting device is subsequently changed according to the operation of the above-indicated another deceleration-value setting device. Accordingly, successive operations of different deceleration-value setting devices depending upon a varying condition of the vehicle permit successive changes of the target deceleration value of the vehicle irrespective of the deceleration-value setting devices which have been operated. Thus, the present deceleration control apparatus has an improved degree of ease of setting of the target deceleration value.

(2) The deceleration control apparatus according to the above-described mode (1), wherein the vehicle includes an engine and an electric motor which are operatively connected to a drive wheel of the vehicle, and further includes an automatic transmission disposed between the engine and the drive wheel, the brake control-portion being operable to control a speed ratio of the automatic transmission for controlling an engine braking torque, and to control a torque generated by the electric motor, for thereby controlling the braking force to be applied to the vehicle.

In the deceleration control apparatus according to the above-described mode (2) of this invention, the brake control portion is arranged to control the speed ratio of the automatic transmission for controlling the engine braking torque, and control the torque generated by the electric motor, for thereby controlling the braking force to be applied to the vehicle. This arrangement permits a more intricate control of the deceleration value of the vehicle than an arrangement in which the target deceleration value is controlled by controlling only the engine braking torque. For instance, the brake control portion controls the electric motor so as to control a vehicle drive torque or regenerative braking torque generated by the electric motor, while at the same time control the speed ratio of the automatic transmission, depending upon an amount of an electric energy stored in an electric-energy storage device provided for operating the electric motor. Thus, the torque generated by the electric motor as well as the engine braking torque is utilized to obtain the desired vehicle braking force, irrespective of the electric energy amount remaining in the electric-energy storage device.

(3) The deceleration control apparatus according to the above-described mode (1) or (2), wherein the target-deceleration-value control portion is operable, in response to an operation of any one of the plurality of deceleration-value setting devices while the braking force is not being controlled by the brake control portion, to set the target deceleration value to an initial value on the basis of a reference deceleration value to be obtained upon the operation of the above-indicated any one of the plurality of deceleration-value setting devices.

In the deceleration control apparatus according to the above-described mode (3) of the invention, the target-deceleration-value control portion is arranged to set the target deceleration value to the initial value when any one of the deceleration-value setting devices is operated while the brake control portion is not in operation to control the braking force. In this case, the initial value is set on the basis of the reference deceleration value which is to be obtained upon operation of the deceleration-value setting device in question. This arrangement prevents a risk of a discomfort as felt by the vehicle operator due to an abrupt change of the vehicle deceleration value (4) The deceleration control apparatus according to the above-described mode (1) or (2), wherein the target-deceleration-value control portion is operable, in response to an operation of any one of the plurality of deceleration-value setting devices while the braking force is not being controlled by the brake control portion, to set the target deceleration value to an initial value on the basis of a reference deceleration value which is determined by a running speed of the vehicle upon the operation of the above-indicated any one of the plurality of deceleration-value setting devices.

In the deceleration control apparatus according to the above-described mode (4), the target-deceleration-value control portion is arranged to set the initial value of the target deceleration value on the basis of the reference deceleration value determined by the vehicle running speed when any one of the deceleration-value setting devices is operated while the brake control portion is not in operation to control the braking force. This arrangement assures an adequate control of the deceleration value of the vehicle irrespective of the running speed of the vehicle. Namely, the deceleration value changes with the vehicle running speed, more precisely, decreases with a decrease of the running speed, while the brake control portion is not in operation, that is, while the braking force to be applied to the vehicle is not being controlled by the brake control portion. Accordingly, it is desirable to set the initial value of the target deceleration value upon initiation of an operation of the brake control portion to control the braking force, on the basis of the reference deceleration value determined by the vehicle running speed upon initiation of control of the braking force. This arrangement prevents an abrupt change of the deceleration value when the vehicle speed is relatively low, and assures an adequate control of the deceleration value when the vehicle speed is relatively high.

(5) The deceleration control apparatus according to the above-described mode (1), wherein the vehicle includes an engine and an electric motor which are operatively connected to a drive wheel of the vehicle, and further includes an automatic transmission which is disposed between the engine and the drive wheel and which has a plurality of forward-drive gear positions, and the automatic transmission has a first forward-drive shift range in which all of the plurality of forward-drive gear positions are available for automatic shifting of the automatic transmission, and at least one second forward-drive shift range in which at least one high-speed gear position selected from among the plurality of forward-drive gear positions is not available for automatic shifting of the automatic transmission, and wherein the brake control portion is operable to control the speed ratio of the automatic transmission for controlling an engine braking torque, and to control a torque generated by the electric motor, for thereby controlling the braking force to be applied to the vehicle, and the target-deceleration-value control portion is operable, in response to an operation of any one of the plurality of deceleration-value setting devices while the braking force is not being controlled by the brake control portion, to set the target deceleration value to an initial value on the basis of a reference deceleration value to be obtained when the first forward-drive shift range of the automatic transmission is selected.

In the deceleration control apparatus according to the above-described mode (5) of this invention, the brake control portion is arranged to control the speed ratio of the automatic transmission for controlling the engine braking torque, and control the torque generated by the electric motor, for thereby controlling the braking force to be applied to the vehicle. As described above with respect to the mode (2) of this invention, this arrangement permits a more intricate control of the deceleration value of the vehicle than an arrangement in which the target deceleration value is controlled by controlling only the engine braking torque. For instance, the brake control portion controls the electric motor so as to control a vehicle drive torque or regenerative braking torque generated by the electric motor, while at the same time control the speed ratio of the automatic transmission, depending upon an amount of an electric energy stored in an electric-energy storage device provided for operating the electric motor. Thus, the torque generated by the electric motor as well as the engine braking torque is utilized to obtain the desired vehicle braking force, irrespective of the electric energy amount remaining in the electric-energy storage device.

The deceleration control apparatus according to the mode (5) of the invention is further arranged such that the target-deceleration-value control portion is operable, in response to an operation of any one of the deceleration-value setting devices while the braking force is not being controlled by the brake control portion, to set the initial value of the target deceleration value on the basis of the reference deceleration value to be obtained when the automatic transmission is operable in the first forward-drive shift range in which all of the plurality of forward-drive gear positions are available for automatic shifting of the automatic transmission. This arrangement permits a more adequate control of the vehicle deceleration value than an arrangement in which the initial target deceleration value is set on the basis of the reference deceleration value to be obtained when the automatic transmission is operable in the second forward-drive shift range in which at least one high-speed gear position of the forward-drive gear positions is not available for automatic shifting of the automatic transmission. That is, when the second forward-drive shift range is selected, the engine braking torque is generally larger than when the first forward-drive shift range is selected, since the speed ratio of the highest-speed gear position available in the second forward-drive shift range is lower than that of the highest speed gear position available in the first forward-drive shift range. If the initial value of the target deceleration value is set on the basis of the reference value to be obtained in the second forward-drive shift range, the deceleration value may be excessively larger than the optimum value, when the automatic transmission is placed in the relatively high-speed gear position.

The deceleration control apparatus of the present invention is suitably applicable to a hybrid vehicle including an engine and an electric motor which are operatively connected to the drive wheel of the vehicle, as described above with respect to the mode (2), but is applicable to any other types of vehicle such as a vehicle including only an engine as a drive-power source, an electric vehicle including only an electric motor or motors as a drive-power source, a vehicle including a drive-power source other than engines and electric motors, and a vehicle including three or more drive-power source devices.

Each electric motor may function as a drive-power source operable to convert an electric energy into a rotary motion, or as an electric generator operable to convert a rotary motion into an electric energy, or alternatively as both of the drive-power source and the electric generator. The hybrid vehicle may be of a parallel type wherein an output of the engine can be transmitted directly to the drive wheel, or of a series type wherein the output of the engine is used solely for operating an electric motor as an electric generator to generate an electric energy and is not transmitted directly to the drive wheel. In the series type hybrid vehicle, the electric energy generated by the electric generator is used for operating another electric motor or stored in an electric-energy storage device such that the stored electric energy is subsequently used by the electric motor or motors.

(6) The deceleration control apparatus according to the above-described mode (2), wherein the brake control portion is operable to control as the braking force a drive-power-source braking torque to be applied to the vehicle by the engine and the electric motor, such that the drive-power-source braking torque is equal to a sum of the engine braking torque and a regenerative torque generated by the electric motor.

(7) The deceleration control apparatus according to the above-described mode (2) or (6), wherein the brake control portion is operable to control as the braking force a drive-power-source braking torque to be applied to the vehicle by the engine and the electric motor such that the drive-power-source braking torque is equal to the engine braking torque minus a forward vehicle drive torque generated by the electric motor.

The brake control portion may be arranged to control the drive-power-source braking torque such that the drive-power-source braking toque is equal to a sum of the engine braking torque and a reverse vehicle-drive torque generated by the electric motor. However, the braking force to be applied to the vehicle may be a sum of a drive-power-source braking torque and a braking force which is generated by a braking device other than the engine and electric motor, such as a braking torque generated by a wheel brake provided for at least one wheel of the vehicle. While the brake control portion according to the above-described mode (2) controls the engine braking torque by controlling the speed ratio or shifting action of the automatic transmission, the engine braking torque may be controlled by controlling the opening and closing timings or the lift amounts of intake and exhaust valves of the engine, or the angle of opening of a throttle valve of the engine.

The automatic transmission may be a step-variable transmission (having a suitable number of forward-drive gear positions, for example, four to eight gear positions) such as a planetary gear type transmission (having a plurality of planetary gear sets) and a parallel-axes type transmission (including a plurality of pairs of mutually meshing shift gears and hydraulic actuators), or of a continuously variable transmission such as a belt-and-pulley type transmission (including variable-diameter pulleys connected to each other by a belt), a toroidal type transmission, and a traction type transmission (including a plurality of rollers interposed between a pair of cones). However, the deceleration control apparatus according to the above-described mode (1) is applicable to a vehicle not including an automatic transmission.

(8) The deceleration control apparatus according to any one of the above-described modes (1)-(7), wherein the vehicle includes a manually operable lever, and the plurality of deceleration-value setting devices include a first deceleration-value setting device operable by the lever to increase and reduce the target deceleration value.

(9) The deceleration control apparatus according to any one of the above-described modes (1)-(8), wherein the vehicle includes a manually operable lever, and the plurality of deceleration-value setting devices includes a second deceleration-value setting device operable irrespective of an operation of the lever to increase and reduce the target deceleration value.

(10) The deceleration control apparatus according to the above-described mode (8) or (9), wherein the lever is located at one of positions of a center console, a floor and an instrument panel of the vehicle.

(11) The deceleration control apparatus according to the above-described mode (9) or (10), wherein the second deceleration-value setting device is provided on a steering wheel of the vehicle or located at a position near the steering wheel.

(12) The deceleration control apparatus according to any one of the above-described modes (8)-(11), wherein the vehicle includes a drive wheel and a transmission operatively connected to the drive wheel, and the lever is a shift lever operable to control a shifting action of the transmission.

The deceleration-value setting devices may include devices located at suitably selected positions of the vehicle which are relatively near the vehicle-operator's seat, such as; switches or other devices that are operable by a transmission lever when the lever is operated to a predetermined position; switches or other devices which are disposed on a steering wheel of the vehicle and directly operable by the vehicle operator; switches disposed on a portion of a steering column which is near the steering wheel; and switches or other devices which are disposed on an instrumental panel of the vehicle. The lever by which the first deceleration-value setting device is operated may be located at a position of a center console of the vehicle provided aside the vehicle-operator's seat, as in the above-described mode (10), or disposed on the steering column. Where the second decelerating-value setting device is provided on the steering wheel or located near the steering wheel, the lever is preferably located at the position of the center console provided aside the vehicle-operator's seat.

The deceleration-value setting devices are preferably self-resetting switches which are automatically reset to their original position and which may be of various types such as a pushbutton type and a lever type. For instance, the target deceleration value is incremented or decremented by a predetermined amount each time the switch is turned on, and may be changed in two or more incremental or decremental steps depending upon a length of time during which the switch is kept on. Alternatively, the target deceleration value is changed continuously with an increase of the length of time during which the switch is kept on. Each of the deceleration-value setting devices may consist of a pair of switches which are operated to respectively increase and reduce the target deceleration value.

(13) The deceleration control apparatus according to the above-described modes (8)-(12), wherein the lever has a deceleration-control-mode selecting position for selecting a deceleration control mode in which the first deceleration-value setting device is operable by an operation of the lever.

(14) The deceleration control apparatus according to the above-described mode (13), wherein the first deceleration-value setting device includes two switches which are turned on by respective movements of the lever from the deceleration-control-mode selecting position, to respectively increase and reduce the target deceleration value.

(15) The deceleration control apparatus according to the above-described mode (13) or (14), further comprising a deceleration-control-mode selector switch which is turned on to establish the deceleration control mode when the lever is operated to the deceleration-control-mode selecting position.

The deceleration-value setting devices are operable in the deceleration control mode. Although the deceleration control mode is automatically selected or established when each of the deceleration-value setting devices is operated, suitable means for selecting or establishing the deceleration control mode may be provided, as described above with respect to the modes (13) and (15).

The deceleration-value setting devices may be made operable only when the deceleration control mode is selected by operating the lever to the deceleration-control-mode selecting position, for example, as described above with respect to the modes (13)-(14). The two switches of the first deceleration-value setting device according to the above-described mode (14) are examples of the deceleration value setting devices that are made operable by operating the lever to the deceleration-control-mode selecting position to select the deceleration control mode. However, the deceleration-value setting devices may include devices which are operable irrespective of whether the deceleration control mode has been selected or established by suitable means such as the deceleration-control mode selector switch described above with respect to the mode (14).

(16) The deceleration control apparatus according to any one of the above-described modes (13)-(15), wherein the second deceleration-value setting device is operable to increase and reduce the target deceleration value irrespective of whether the deceleration control mode has been selected by operating the lever to the deceleration-control-mode selecting position.

The deceleration control mode may be canceled when the target deceleration value is reduced by the deceleration-value setting devices to an initial or original value (which is the value prior to the selection of the deceleration control mode), or when the lever is returned from the deceleration-control-mode selecting position back to one of its other operating positions, for instance, to a forward-drive position.

(17) The deceleration control apparatus according to the above-described mode (2) or (5), wherein the target-deceleration-value control portion is operable to change the target deceleration value in steps upon successive operations of each of the plurality of deceleration-value setting devices such that the target deceleration value is changed by a predetermined amount each time each deceleration-value setting device is operated, the brake control portion controlling the speed ratio of the automatic transmission and the torque of the electric motor such that an amount of change of a deceleration value of the vehicle caused by an amount of change of the torque of the electric motor corresponding to the predetermined amount of change of the target deceleration value is smaller than an amount of change of the deceleration value caused by an amount of change of the engine braking toque corresponding to the predetermined amount of change of the target deceleration value.

In the deceleration control apparatus according to the above-described mode (17), the deceleration value of the vehicle can be intricately controlled by the brake control portion by controlling both the speed ratio of the automatic transmission (step-variable transmission) to control the engine braking torque and the torque of the electric motor, according to the target deceleration value changed by the target-deceleration-value control portion in response to the operations of the deceleration-value setting devices. The predetermined amount of increase of the target deceleration value by the target-deceleration-value control portion may or may not be equal to each other.

(18) The deceleration control apparatus according to any one of the above-described modes (1)-(17), wherein the brake control portion is operable to calculate a required value of the braking force to be applied to the vehicle, on the basis of the target deceleration value changed by the target-deceleration-value control portion, and according to a predetermined relationship between the required value and the target deceleration value.

The predetermined relationship used by the brake control portion to calculate the required braking force may be represented by a mathematical equation or data map stored in a memory of the deceleration control apparatus. The brake control portion may be arranged to control the engine braking torque and the torque (forward drive torque, reverse drive torque or regenerative braking torque) of the electric motor, for controlling a sum of the engine braking torque and the torque of the electric motor, such that the sum is equal to a drive-power-source braking torque corresponding to the calculated braking force. Preferably, the required braking force is calculated on the basis of not only the target deceleration value but also other parameters which influence the required braking force, such as the gradient of a road surface on which the vehicle is running, and the weight and/or the number of occupants of the vehicle. Preferably, the actual deceleration value of the vehicle is detected to feedback-control the braking force to be applied to the vehicle, on the basis of the detected actual deceleration value, so that the actual deceleration value coincides with the target deceleration value as determined by the target-deceleration-value control portion.

(19) A deceleration control apparatus for controlling a deceleration value of a vehicle, characterized by comprising (a) a plurality of deceleration-value setting devices operable by an operator of the vehicle, to set a target deceleration value of the vehicle, (b) a deceleration-value control portion operable to control the deceleration value of the vehicle according to the target deceleration value set by each of the plurality of deceleration-value setting devices, if the deceleration-value setting device is kept operated for at least a predetermined non-responsive time, and (c) a non-responsive-time changing portion operable to change the predetermined non-responsive time depending upon an operated one of the plurality of deceleration-value setting devices.

In the deceleration control apparatus according to the above-described mode (19) of this invention, the deceleration-value control portion is operable to control the deceleration value of the vehicle according to the target deceleration vale set by each deceleration-value setting device, if the deceleration-value setting device is kept operated for the predetermined non-responsive time. Since the non-responsive-time changing portion is provided to change the non-responsive time depending upon the specific one of the deceleration-value setting devices, the deceleration value of the vehicle can be controlled by the deceleration-value control portion, as desired by the vehicle operator, such that the vehicle-operator's intention to change or not to change the deceleration value is accurately reflected on the controlled deceleration value. For example, the plurality of deceleration-value setting devices include a first deceleration-value setting device operable by a manually operable member located near a center console of the vehicle, and a second deceleration-value setting device located near a steering wheel of the vehicle. In this case, a possibility of an erroneous operation of the second deceleration-value setting device by the vehicle operator without an intention to change the target deceleration value is generally higher than that of the first deceleration setting device, so that the non-responsive time for the second deceleration-value setting device is preferably set to be longer than that for the first deceleration-value setting device. This arrangement prevents an unintended change of the target deceleration value due to an erroneous operation of the second deceleration-value setting device without an intention to change the target deceleration value.

(20) A deceleration control apparatus for controlling a deceleration value of a vehicle, characterized by comprising (a) a plurality of deceleration-value setting devices operable by an operator of the vehicle, to set a target deceleration value of the vehicle, (b) a deceleration-value control portion operable to control the deceleration value of the vehicle according to the target deceleration value set by each of the plurality of deceleration-value setting devices, if the deceleration-value setting device is kept operated for at least a predetermined non-responsive time, and (c) a non-responsive-time changing portion operable to change the predetermined non-responsive time on the basis of a hysteresis of operations of each of the deceleration-value setting devices.

In the deceleration control apparatus according to the above-described mode (20), the non-responsive-time changing portion is provided to change the non-responsive time of each deceleration-value setting device on the basis of the hysteresis of operations of the deceleration-value setting device, for example, a cumulative operating time or a cumulative number of operations of the deceleration-value setting device, so that the deceleration value of the vehicle can be controlled by the deceleration-value control portion, as desired by the vehicle operator, such that the vehicle-operator's intention to change or not to change the deceleration value is accurately reflected on the controlled deceleration value. In this respect, it is noted that a possibility of an erroneous operation of each deceleration-value setting device without an intention to change the target deceleration value is generally lower when the cumulative operating time or number of operations of that deceleration-value setting device is relatively long or large, so that the non-responsive time for the deceleration-value setting device whose cumulative operating time or number of operations is relatively short or small is preferably set to be longer than that for the deceleration-value setting device whose cumulative operating time or number of operations is relatively long or large. This arrangement prevents an unintended change of the target deceleration value due to an erroneous operation of the deceleration-value setting device whose cumulative operating time or number of operations is relatively short or small.

(28) A deceleration control apparatus for controlling a deceleration value of a vehicle, characterized by comprising (a) a plurality of deceleration-value setting devices operable by an operator of the vehicle, to set a target deceleration value of the vehicle, (b) a deceleration-value control portion operable to control the deceleration value of the vehicle according to the target deceleration value set by each of the plurality of deceleration-value setting devices, if the deceleration-value setting device is kept operated for at least a predetermined non-responsive time, (c) a deceleration-control-mode selecting device manually operable to select a deceleration control mode in which the deceleration-value control portion is operable to control the deceleration value, and (d) a non-responsive-time changing portion operable to change the predetermined non-responsive time depending upon whether the deceleration control mode has been selected by the deceleration-control-mode selecting device or not.

In the deceleration control apparatus according to the above-described mode (21), the non-responsive-time changing portion is provided to change the non-responsive time of each deceleration-value setting device depending upon whether the deceleration control mode has been selected by the deceleration-control-mode selecting device or not, so that the deceleration value of the vehicle can be controlled by the deceleration-value control portion, as desired by the vehicle operator, such that the vehicle-operator's intention to change or not to change the deceleration value is accurately reflected on the controlled deceleration value. In this respect, it is noted that a possibility of an erroneous operation of each deceleration-value setting device without an intention to change the target deceleration value is generally lower after the selection of the deceleration control mode, so that the non-responsive time for each deceleration-value setting device after the selection of the deceleration control mode is preferably set to be shorter than that before the selection of the deceleration control mode. In other words, the non-responsive time is longer when each deceleration-value setting device is operated for the first time upon selection of the deceleration control mode, than when the deceleration-value setting device is operated subsequently in the deceleration control mode. This arrangement prevents an unintended change of the target deceleration value due to an erroneous operation of the deceleration-value setting device whose cumulative operating time or number of operations is relatively short or small.

(22) A deceleration control apparatus for controlling a deceleration value of a vehicle, characterized by comprising (a) a plurality of deceleration-value setting devices operable by an operator of the vehicle, to set a target deceleration value of the vehicle, (b) a deceleration-value control portion operable to control the deceleration value of the vehicle according to the target deceleration value set by each of the plurality of deceleration-value setting devices, if the deceleration-value setting device is kept operated for at least a predetermined non-responsive time, and (c) a non-responsive-time changing portion operable to change the predetermined non-responsive time on the basis of a direction of change of the target deceleration value as set by each of the plurality of deceleration-value setting devices.

In the deceleration control apparatus according to the above-described mode (22), the non-responsive-time changing portion is provided to change the non-responsive time of each deceleration-value setting device on the basis of the direction of change of the target deceleration value as set by each deceleration-value setting device, so that the deceleration value of the vehicle can be controlled by the deceleration-value control portion, as desired by the vehicle operator, such that the vehicle-operator's intention to change or not to change the deceleration value is accurately reflected on the controlled deceleration value.

(23) The deceleration control apparatus according to the above-described mode (22), wherein the non-responsive-time changing portion is operable to increase the predetermined non-responsive time when each of the deceleration-value setting devices is operated to increase the target deceleration value.

In connection with the non-responsive-time changing portion provided in the deceleration control apparatus according to the above-described mode (23), it is noted that an erroneous operation of the deceleration-value setting device without an intention to change the target deceleration value has a larger influence on the deceleration value of the vehicle when the deceleration-value setting device is operated to increase the target deceleration value than when it is operated to reduce the target deceleration value. Accordingly, an increase of the non-responsive time upon operation of the deceleration-value setting device to increase the target deceleration value is effective to reduce an influence of the erroneous operation of the deceleration-value setting device on the actual deceleration value of the vehicle.

(24) A deceleration control apparatus for controlling a deceleration value of a vehicle, characterized by comprising (a) a plurality of deceleration-value setting devices operable by an operator of the vehicle, to set a target deceleration value of the vehicle, (b) a deceleration-value control portion operable to control the deceleration value of the vehicle according to the target deceleration value set by each of the plurality of deceleration-value setting devices, if the deceleration-value setting device is kept operated for at least a predetermined non-responsive time, and (c) a non-responsive-time changing portion operable to change the predetermined non-responsive time on the basis of a running condition of the vehicle.

In the deceleration control apparatus according to the above-described mode (24) of this invention, the deceleration-value control portion is operable to control the deceleration value of the vehicle according to the target deceleration vale set by each deceleration-value setting device, if the deceleration-value setting device is kept operated for the predetermined non-responsive time. Since the non-responsive-time changing portion is provided to change the non-responsive time on the basis of the specific running condition of the vehicle, the deceleration value of the vehicle can be controlled by the deceleration-value control portion, as desired by the vehicle operator, such that the vehicle-operator's intention to change or not to change the deceleration value is accurately reflected on the controlled deceleration value.

(25) The deceleration control apparatus according to the above-described mode (24), wherein the non-responsive-time changing portion is operable to increase the non-responsive time with an increase in a running speed of the vehicle.

In connection with the non-responsive-time changing portion provided in the deceleration control apparatus according to the above-described mode (25), it is noted that an erroneous operation of the deceleration-value setting device without an intention to change the target deceleration value has a larger influence on the deceleration value of the vehicle when the vehicle running speed is relatively high than when it is relatively low. Accordingly, an increase of the non-responsive time upon operation of the deceleration-value setting device with an increase of the running speed of the vehicle is effective to reduce an influence of the erroneous operation of the deceleration-value setting device on the actual deceleration value of the vehicle.

(26) The deceleration control apparatus according to the above-described mode (24) or (25), wherein the non-responsive-time changing portion is operable to increase the non-responsive time with an increase of an angle of operation (rotation) of a steering wheel of the vehicle.

In connection with the non-responsive-time changing portion provided in the deceleration control apparatus according to the above-described mode (26), it is noted that an erroneous operation of the deceleration-value setting device without an intention to change the target deceleration value has a larger influence on the deceleration value of the vehicle when the angle of operation of the steering wheel is relatively large than when it is relatively small, that is, when the radius of a curve along which the vehicle is cornering is relatively small, that when it is relatively large. Accordingly, an increase of the non-responsive time upon operation of the deceleration-value setting device with an increase of the angle of operation of the steering wheel is effective to reduce an influence of the erroneous operation of the deceleration-value setting device on the actual deceleration value of the vehicle.

(27) The deceleration control apparatus according to any one of the above-described modes (24)-(26), wherein the non-responsive-time changing portion is operable to increase the non-responsive time with an increase of a speed ratio of an automatic transmission of the vehicle, which is a ratio of a speed of an input member of the automatic transmission to a speed of an output member of the automatic transmission.

In connection with the non-responsive-time changing portion provided in the deceleration control apparatus according to the above-described mode (27), it is noted that an erroneous operation of the deceleration-value setting device without an intention to change the target deceleration value has a larger influence on the deceleration value of the vehicle when the automatic transmission is placed in a relatively low-speed gear position having a relatively high speed ratio than when the automatic transmission is placed in a relatively high-speed gear position having a relatively low speed ratio. Accordingly, an increase of the non-responsive time upon operation of the deceleration-value setting device with an increase of the speed ratio of the automatic transmission is effective to reduce an influence of the erroneous operation of the deceleration-value setting device on the actual deceleration value of the vehicle.

(28) The deceleration control apparatus according to any one of the above-described modes (24)-(27), wherein the non-responsive-time changing portion is operable to change the non-responsive time such that the non-responsive time is relatively long when a service brake of the vehicle is not in operation than when the service brake is in operation.

In connection with the non-responsive-time changing portion provided in the deceleration control apparatus according to the above-described mode (28), it is noted that an erroneous operation of the deceleration-value setting device without an intention to change the target deceleration value has a larger influence on the deceleration value of the vehicle when the service brake (e.g., a braking device provided for each wheel of the vehicle) is not in operation than when the service brake is in operation. Accordingly, the arrangement to change the non-responsive time such that the non-responsive time is relatively long when the service brake is not in operation is effective to reduce an influence of the erroneous operation of the deceleration-value setting device on the actual deceleration value of the vehicle.

(29) The deceleration control apparatus according to any one of the above-described modes (24)-(28), wherein the non-responsive-time changing portion is operable to increase the non-responsive time with a decrease of a friction coefficient of a road surface on which the vehicle is running.

In connection with the non-responsive-time changing portion provided in the deceleration control apparatus according to the above-described mode (29), it is noted that an erroneous operation of the deceleration-value setting device without an intention to change the target deceleration value has a larger influence on the deceleration value of the vehicle when the road surface has a relatively low friction coefficient than when it has a relatively high friction coefficient, for example, when the vehicle is running on a snow-covered road surface than when it is running on a dry road surface. Accordingly, an increase of the non-responsive time with a decrease of the friction coefficient of the road surface is effective to reduce an influence of the erroneous operation of the deceleration-value setting device on the actual deceleration value of the vehicle.

(30) A deceleration control apparatus for controlling a deceleration value of a vehicle, characterized by comprising (a) a plurality of deceleration-value setting devices operable by an operator of the vehicle, to set a target deceleration value of the vehicle, (b) a deceleration-value control portion operable to control the deceleration value of the vehicle according to the target deceleration value set by each of the plurality of deceleration-value setting devices, if the deceleration-value setting device is kept operated for at least a predetermined non-responsive time, and (c) a non-responsive-time changing portion operable to increase the predetermined non-responsive time with an increase of the present target deceleration value of the vehicle.

In the deceleration control apparatus according to the above-described mode (30) of this invention, the deceleration-value control portion is operable to control the deceleration value of the vehicle according to the target deceleration vale set by each deceleration-value setting device, if the deceleration-value setting device is kept operated for the predetermined non-responsive time. Since the non-responsive-time changing portion is provided to increase the non-responsive time with an increase of the present target deceleration value of the vehicle, the deceleration value of the vehicle can be controlled by the deceleration-value control portion, as desired by the vehicle operator, such that the vehicle-operator's intention to change or not to change the deceleration value is accurately reflected on the controlled deceleration value. In this respect, it is noted that an erroneous operation of the deceleration-value setting device without an intention to change the target deceleration value has a larger influence on the deceleration value of the vehicle when the present target deceleration value is relatively high than when it is relatively low. Accordingly, an increase of the non-responsive time with an increase of the present target deceleration value is effective to reduce an influence of the erroneous operation of the deceleration-value setting device on the actual deceleration value of the vehicle.

The deceleration-value setting devices may be manually operable by hand, finger(s) or foot of the vehicle operator, or operable by a voice generated by the vehicle operator, such that the target deceleration value is incremented or decremented each time the deceleration-value setting device is operated.

(31) The deceleration control apparatus according to the above-described mode (21), wherein the deceleration-control-mode selecting device a switch which is turned on to establish the deceleration control mode when a shift lever for controlling a shifting action of an automatic transmission is operated to a deceleration-control-mode selecting position.

The foregoing descriptions in paragraphs [0027]-[0033] relating to the mode (1) of this invention are also relevant to the above-described mode (31), and the deceleration-value setting devices which are operable in the deceleration control mode to set or change the target deceleration value.

The deceleration-value control portion may be arranged to change the deceleration value of the vehicle only when any one of the deceleration-value setting devices is operated after the deceleration control mode is selected by the deceleration-control-mode selecting device, for example, after the shift lever is operated to the deceleration-control-mode selecting position. However, the deceleration-value control portion may be arranged to set the deceleration value to an initial value upon selection of the deceleration control mode, without an operation of any deceleration-value setting device.

The shift lever provided in the above-described mode (31) may have forward-drive gear positions in addition to the deceleration-control-mode selecting position, so that the automatic transmission is mechanically placed in a forward-drive state when the shift lever is operated to any one of those forward-drive gear positions. However, the automatic transmission may be placed in the forward-drive state by operating a switch or switches. In any one of the forward-drive gear positions of the shift lever, the automatic transmission is placed in the forward-drive state to drive the vehicle in the forward direction with an operation of an accelerator pedal. The forward-drive gear positions may include a full-range drive position in which all of the forward-drive gear positions are available for automatic shifting of the automatic transmission.

(32) A deceleration control apparatus for controlling a deceleration value of a vehicle, characterized by comprising (a) a deceleration-value setting device operable by an operator of the vehicle, to set a target deceleration value of the vehicle, (b) a target-deceleration-value control portion operable to change the target deceleration value of the vehicle according to the target deceleration value set by the deceleration-value setting device, (c) a preliminary-deceleration-setting-mode selecting device operable by the operator of the vehicle, to select a preliminary deceleration setting mode that must be established before the deceleration-value setting device is operable to set the target deceleration value, and (d) a change-pattern changing portion operable to change a pattern of change of the target deceleration value by the target-deceleration-value control portion, depending upon whether the preliminary deceleration setting mode has been selected by the preliminary-deceleration-setting-mode selecting device or not.

In the deceleration control apparatus according to the above-described mode (32) of this invention, the target-deceleration-value control portion is operable to control the target deceleration value of the vehicle according to the target deceleration vale set by the deceleration-value setting device, and the change-pattern changing portion is arranged to change the pattern of change of the target deceleration value by the target-deceleration-value control portion, depending upon whether the preliminary deceleration control setting mode has been selected by the preliminary-deceleration-setting-mode selecting device or not, so that the target deceleration value of the vehicle can be controlled by the target-deceleration-value control portion, as desired by the vehicle operator, such that the vehicle-operator's desire to change the deceleration value is accurately reflected on the target deceleration value as changed by the target-deceleration-value control portion. In this respect, it is noted that the selection of the preliminary deceleration setting mode by the operator through the preliminary-deceleration-setting-mode selecting device indicates a relatively strong desire of the vehicle operator to positively change the target deceleration value than when the preliminary decelerating setting mode is not selected. Accordingly, the operator's desire to change the target deceleration value is accurately reflected on the target deceleration value as changed by the target-deceleration-value control portion in the pattern which changes depending upon whether the preliminary deceleration setting mode has been selected or not.

(33) The deceleration control apparatus according to the above-described mode (32), wherein the change-pattern changing portion is operable to change the pattern of change of the target deceleration value by the target-deceleration-value control portion such that a maximum amount of change of the target deceleration value is larger when the preliminary deceleration setting mode has been selected than when the preliminary deceleration setting mode has not been selected.

In the deceleration control apparatus according to the above-described mode (33) wherein the target deceleration value is changed such that the maximum amount of change is larger when the preliminary deceleration setting mode has been selected, the operator's desire to change the target deceleration value is accurately reflected on the changed target deceleration value, since the selection of the preliminary deceleration setting mode indicates the relatively strong desire of the operator to change the target deceleration value. When the preliminary deceleration setting mode has not been selected by the preliminary-deceleration-setting-mode selecting device, this indicates a relatively weak desire of the operator to change the target deceleration value, so that the maximum amount of change of the target deceleration value is made relatively small in this case, for preventing an excessively large amount of change of the target deceleration value even when the deceleration-value setting device is operated.

(34) A deceleration control apparatus for a controlling deceleration value of a vehicle, characterized by comprising (a) a deceleration-value setting device operable by an operator of the vehicle, to set a target deceleration value of the vehicle, (b) a target-deceleration-value control portion operable to change the target deceleration value of the vehicle according to the target deceleration value set by the deceleration-value setting device, if the deceleration-value setting device is kept operated for at least a predetermined judgment time, (c) a preliminary-deceleration-setting-mode selecting device operable by the operator of the vehicle, to select a preliminary deceleration setting mode that must be established before the deceleration-value setting device is operable to set the target deceleration value, and (d) a judgment-time changing portion operable to change the predetermined judgment time, depending upon whether the preliminary deceleration setting mode has been selected by the preliminary-deceleration-setting-mode selecting device or not.

In the deceleration control apparatus according to the above-described mode (34) of this invention, the target-deceleration-value control portion is operable to control the target deceleration value of the vehicle according to the target deceleration vale set by the deceleration-value setting device, if the deceleration-value setting device is kept operated for at least the predetermined judgment time. Since the judgment-time changing portion is arranged to change the judgment time, depending upon whether the preliminary deceleration control setting mode has been selected by the preliminary-deceleration-setting-mode selecting device or not, the target deceleration value of the vehicle can be controlled by the target-deceleration-value control portion, as desired by the vehicle operator, such that the vehicle-operator's desire to change the deceleration value is accurately reflected on the deceleration value as changed by the target-deceleration-value control portion. In this respect, it is noted that the selection of the preliminary deceleration setting mode by the operator through the preliminary-deceleration-setting-mode selecting device indicates a relatively strong desire of the vehicle operator to positively change the target deceleration value than when the preliminary decelerating setting mode is not selected. Accordingly, the operator's desire to change the target deceleration value is accurately reflected on the target deceleration value as changed by the target-deceleration-value control portion the judgment time of which changes depending upon whether the preliminary deceleration setting mode has been selected or not.

(35) The deceleration control apparatus according to the above-described mode (31), wherein the judgment-time changing operation is operable to change the predetermined judgment time such that the judgment time is shorter when the preliminary deceleration setting mode has been selected by the preliminary-decelerations-setting-mode selecting device.

In the deceleration control apparatus according to the above-described mode (35) wherein the judgment time is changed such that the judgment time is shorter when the preliminary deceleration setting mode has been selected, the operator's desire to change the target deceleration value is accurately reflected on the change of the target deceleration value by the target-deceleration-value control portion, since the selection of the preliminary deceleration setting mode indicates the relatively strong desire of the operator to change the target deceleration value with a relatively high degree of response to an operation of the deceleration-value setting device. When the preliminary deceleration setting mode has not been selected by the preliminary-deceleration-setting-mode selecting device, this indicates a relatively weak desire of the operator to change the target deceleration value, so that the judgment time is made relatively long in this case, for assuring a change of the target deceleration value only when the deceleration-value setting device is kept operated for a relatively long time. This arrangement prevents an unintended change of the target deceleration value due to an erroneous operation of the deceleration-value setting device without an intention of the vehicle operator to change the target deceleration value.

(36) A deceleration control apparatus for controlling a deceleration value of a vehicle, characterized by comprising (a) a plurality of deceleration-value setting devices operable by an operator of the vehicle, to set a target deceleration value of the vehicle, (b) a target-deceleration-value control portion operable to change the target deceleration value of the vehicle according to the target deceleration value set by each of the plurality of deceleration-value setting devices, and (c) a change-pattern changing portion operable to change a pattern of change of the target deceleration value by the target-deceleration-value control portion, depending upon an operated one of the plurality of deceleration-value setting devices.

In the deceleration control apparatus according to the above-described mode (36) of this invention, the target-deceleration-value control portion is operable to control the target deceleration value of the vehicle according to the target deceleration vale set by each deceleration-value setting device, and the change-pattern changing portion is arranged to change the pattern of change of the target deceleration value by the target-deceleration-value control portion, depending upon the operated one of the deceleration-value setting devices, so that the target deceleration value of the vehicle can be controlled by the target-deceleration-value control portion, as desired by the vehicle operator, such that the vehicle-operator's desire to change the deceleration value is accurately reflected on the target deceleration value as changed by the target-deceleration-value control portion. In this respect, it is noted that the plurality of deceleration-value setting devices have different possibilities of an erroneous operation by the vehicle operator without an intention to change the target deceleration value, so that it is preferred to change the pattern of change of the target deceleration value depending upon the specific kind of the operated deceleration-value setting device. This arrangement prevents an unintended change of the target deceleration value due to an erroneous operation of any deceleration-value setting device without an intention to change the target deceleration value.

(37) The deceleration control apparatus according to the above-described mode (36), wherein said plurality of deceleration-value setting device includes a first deceleration-value setting device disposed on a portion of a floor of the vehicle which is near an operator's seat, and a second deceleration-value setting device located near a steering wheel of the vehicle, and said change-pattern changing portion is operable to change the pattern of change of the target deceleration value by the target-deceleration-value control portion such that a maximum amount of change of the target deceleration value is larger when the first deceleration-value setting device is operated than when the second deceleration-value setting device is operated.

In connection with the change-pattern changing portion provided in the deceleration control apparatus according to the above-described mode (37), it is noted that a possibility of an erroneous operation of the second deceleration-value setting device without an intention of the vehicle operator to change the target deceleration value is generally higher than that of the first deceleration-value setting device, and that an operation of the first deceleration-value setting device indicates a relatively strong desire of the vehicle operator to positively change the target deceleration value, so that the operator's desire is accurately reflected on the target deceleration value as changed by the target-deceleration-value control portion such that the maximum amount of change of the target deceleration value is larger when the first deceleration-value setting device is operated. On the other hand, an operation of the second deceleration-value setting device indicates a relatively weak desire of the vehicle operator to change the target deceleration value, so that the maximum amount of change of the target deceleration value is made relatively small in this case, for preventing an excessively large amount of change of the target deceleration value when the second deceleration-value setting device is operated.

(38) A deceleration control apparatus for controlling a deceleration value of a vehicle, characterized by comprising (a) a plurality of deceleration-value setting devices operable by an operator of the vehicle, to set a target deceleration value of the vehicle, (b) a target-deceleration-value control portion operable to change the target deceleration value of the vehicle according to the target deceleration value set by each of the plurality of deceleration-value setting devices, if this deceleration-value setting device is kept operated for at least a predetermined judgment time, and (c) a judgment-time changing portion operable to change the predetermined judgment time, depending upon an operated one of the plurality of deceleration-value setting devices.

In the deceleration control apparatus according to the above-described mode (38) of this invention, the target-deceleration-value control portion is operable to control the target deceleration value of the vehicle according to the target deceleration vale set by each deceleration-value setting device, if the deceleration-value setting device is kept operated for at least the predetermined judgment time, and the judgment-time changing portion is arranged to change the judgment time, depending upon the operated one of the deceleration-value setting devices, so that the target deceleration value of the vehicle can be controlled by the target-deceleration-value control portion, as desired by the vehicle operator, such that the vehicle-operator's desire to change or not to change the deceleration value is accurately reflected on the target deceleration value as changed by the target-deceleration-value control portion. In this respect, it is noted that the plurality of deceleration-value setting devices have different possibilities of an erroneous operation by the vehicle operator without an intention to change the target deceleration value, so that it is preferred to change the judgment time depending upon the specific kind of the operated deceleration-value setting device. This arrangement prevents an unintended change of the target deceleration value due to an erroneous operation of any deceleration-value setting device without an intention to change the target deceleration value.

(39) The deceleration control apparatus according to the above-described mode (38), wherein said plurality of deceleration-value setting device includes a first deceleration-value setting device disposed on a portion of a floor of the vehicle which is near an operator's seat, and a second deceleration-value setting device located near a steering wheel of the vehicle, and said judgment-time changing portion is operable to change the judgment time such that the judgment time is shorter for the first deceleration-value setting device than that for the second deceleration-value setting device.

In connection with the change-pattern changing portion provided in the deceleration control apparatus according to the above-described mode (39), it is noted that a possibility of an erroneous operation of the second deceleration-value setting device without an intention of the vehicle operator to change the target deceleration value is generally higher than that of the first deceleration-value setting device, and that an operation of the first deceleration-value setting device indicates a relatively strong desire of the vehicle operator to positively change the target deceleration value, so that the operator's desire is accurately reflected on the target deceleration value as changed by the target-deceleration-value control portion such that the target deceleration value is changed with a relatively high degree of response to an operation of the deceleration-value setting device. On the other hand, an operation of the second deceleration-value setting device indicates a relatively weak desire of the vehicle operator to change the target deceleration value, so that the judgment time is made relatively long in this case, for preventing an erroneous operation of the second deceleration-value setting device without an intention of the vehicle operator to change the target deceleration value.

The foregoing descriptions in paragraphs [0017]-[0040] and in paragraphs [0065]-[0069] may be applicable to the above-described modes (32)-(39), where appropriate.

The deceleration control mode in which the target deceleration value is changed by the target-deceleration-value control portion according to the target deceleration value set by each deceleration-value setting device may be established when the preliminary deceleration setting mode is selected by the preliminary-deceleration-setting-ode selecting device, or when any deceleration-value setting device is operated, for example, when the second deceleration-value setting device described above is operated while the preliminary deceleration setting mode is not selected. In the latter case, the deceleration control mode is preferably canceled when the second deceleration-value setting device is operated to reduce the target deceleration value to the predetermined initial or original value which is the target deceleration value prior to the initiation of control of the target deceleration value by the deceleration-value setting devices.

(40) A deceleration control apparatus for controlling a deceleration value of a vehicle, characterized by comprising (a) a deceleration-value setting device operable by an operator of the vehicle, to set a target deceleration value of the vehicle, (b) a target-deceleration-value control portion operable to change the target deceleration value of the vehicle according to the target deceleration value set by the deceleration-value setting device, (c) a preliminary-deceleration-setting-mode selecting device operable by the operator of the vehicle, to select a preliminary deceleration setting mode before an operation of the deceleration-value setting device, and (d) a validating/invalidating switching portion operable, depending upon which one of a conditional state and an unconditional state is selected by the operator, to invalidate the deceleration-value setting device when the preliminary deceleration setting mode has not been selected, when the conditional state is selected, and to validate the deceleration-value setting device irrespective of whether the preliminary deceleration setting mode has been selected or not, when the unconditional state is selected.

In the deceleration control apparatus according to the above-described mode (40) wherein the target deceleration value of the vehicle can be changed according to the target deceleration value set by the deceleration-value setting device, the deceleration-value setting device is either invalidated or validated when the preliminary deceleration setting mode has not been selected, by the validating/invalidating switching portion, depending upon whether the conditional state or the unconditional state is selected by the vehicle operator. Accordingly, the target deceleration value can be suitably controlled, as desired by the vehicle operator. In particular, the deceleration-value setting device can be validated by the vehicle operator, even while the preliminary deceleration setting mode is not selected by the preliminary-deceleration-setting-mode selecting device.

(41) The deceleration control apparatus according to the above-described mode (40), wherein the deceleration-setting device includes a first deceleration-value setting device and a second deceleration-value setting device which are located at respective different locations in the vehicle, the first deceleration-value setting device being invalid before the preliminary deceleration setting mode is selected, and the second deceleration-value setting device being invalidated by the validating/invalidating switching portion when the conditional state is selected by the operator of the vehicle while the preliminary deceleration setting mode is not selected, and validated by the validating/invalidating switching portion when the unconditional state is selected by the operator, irrespectively of whether the preliminary deceleration setting mode has been selected or not.

In the deceleration control apparatus according to the above-described mode (41), the first deceleration-value setting device is validated when the preliminary deceleration setting mode is selected by the preliminary-deceleration-setting-mode selecting device, and invalidated when the preliminary deceleration setting mode is not selected. On the other hand, the second deceleration-value setting device is validated even while the preliminary deceleration setting mode is not selected, if the unconditional state is selected by the vehicle operator. Thus, while the preliminary deceleration setting mode is not selected, the second deceleration-value setting device is either validated when the unconditional state is selected by the vehicle operator, and invalidated when the conditional state is selected by the vehicle operator. In the conditional state, the selection of the preliminary deceleration setting mode is required to validate the second deceleration-value setting device. Accordingly, the first and second deceleration-value setting devices located at the different locations can be suitably validated and invalidated depending upon whether the preliminary deceleration setting mode has been selected or not, and depending upon whether the conditional or unconditional state has been selected by the vehicle operator.

(42) The deceleration control apparatus according to the above-described mode (38), wherein the first deceleration-value setting device is located near a seat of the operator of the vehicle, and the second deceleration-value setting device is located near a steering wheel of the vehicle.

In the deceleration control apparatus according to the above-described mode (42), a possibility of an erroneous operation of the second deceleration-value setting device without an intention of the vehicle operator to change the target deceleration value is generally higher than that of the first deceleration-value setting device, so that the second deceleration-value setting device is invalidated while the preliminary deceleration setting mode is not selected, if the conditional state is selected by the vehicle operator. However, even while the preliminary deceleration setting mode is not selected, the second deceleration-value setting device can be validated by the vehicle operator by selecting the unconditional state.

(43) The deceleration control apparatus according to the above-described mode (41) or (42), wherein the first deceleration-value setting device includes a manually operable member having a preliminary-deceleration-setting-mode selecting position for selecting the preliminary deceleration setting mode, and a target-deceleration-value setting position, the manually operable member being movable from the preliminary-deceleration-setting-mode selecting position to the target-deceleration-value setting position, to set the target deceleration value of the vehicle, the preliminary-deceleration-setting-mode selecting device including this manually operable member.

In the deceleration control apparatus according to the above-described mode (43), the target deceleration value can be set by the first deceleration-value setting device only after the preliminary deceleration setting mode has been selected by moving the manually operable member to the preliminary-deceleration-setting-mode selecting position. However, the target deceleration value can be set by the second deceleration-value setting device, even while the preliminary deceleration setting mode is not selected or even before this mode is selected, provided the unconditional state is selected by the vehicle operator.

The foregoing descriptions in paragraphs [0017]-[0040] and in paragraphs [0065]-[0069] are applicable to the above-described modes (40)-(43), where appropriate.

(44) A deceleration control apparatus for controlling a deceleration value of a vehicle, comprising (a) a target-deceleration-value control portion operable to change a target deceleration value of the vehicle according to an operation of deceleration-value setting means, and (b) a brake control portion operable to control a braking force to be applied to the vehicle according to the target deceleration value changed by the target-deceleration-value control portion, in a deceleration control mode, the deceleration control apparatus being characterized in that the target-deceleration-value control portion includes an initial-value setting portion operable to set the target deceleration value to an initial value on the basis of a reference value of the target deceleration value to be obtained in a forward-drive mode of the vehicle, when the deceleration control mode is selected without once establishing the forward-drive mode.

In the deceleration control apparatus according to the above-described mode (44), the target-deceleration-value control portion is arranged to set the initial value of the target deceleration value upon selection of the deceleration control mode without once establishing the forward-drive mode, such that the initial value is determined on the basis of the reference target deceleration value to be obtained in the forward-drive mode. For example, the initial deceleration value is set to be equal to or slightly higher than the reference value in the forward-drive mode. This arrangement prevents abrupt application of an excessively large braking force to the vehicle upon selection of the deceleration control mode, which would be felt uncomfortable to the vehicle operator.

(45) The deceleration control apparatus according to the above-described mode (44), wherein the reference value of the target deceleration value used by the initial-value setting portion to set the initial value of the target deceleration value is a target deceleration value in the forward-drive mode while a vehicle accelerating member operable to accelerate the vehicle is not in operation.

(46) A deceleration control apparatus for controlling a deceleration value of a vehicle, comprising (a) a target-deceleration-value control portion operable to change a target deceleration value of the vehicle according to an operation of deceleration-value setting means, and (b) a brake control portion operable control a braking force to be applied to the vehicle according to the target deceleration value changed by the target-deceleration-value control portion, in a deceleration control mode, the deceleration control apparatus being characterized in that the target-deceleration-value control portion includes an initial-value setting portion operable to set the target deceleration value to an initial value on the basis of a present running condition of the vehicle, when the deceleration control mode is selected without once establishing a forward-drive mode.

In the deceleration control apparatus according to the above-described mode (46), the target-deceleration-value control portion is arranged to set the initial value of the target deceleration value upon selection of the deceleration control mode, without once establishing the forward-drive mode, such that the initial value is determined according to the present running condition of the vehicle. This arrangement also prevents abrupt application of an excessively large braking force to the vehicle upon selection of the deceleration control mode, which would be felt uncomfortable to the vehicle operator.

(47) The deceleration control apparatus according to the above-described mode (43), wherein the present running condition of the vehicle used by the initial-value setting portion to set the initial value of the target deceleration value includes a running speed of the vehicle.

In the deceleration control apparatus according to the above-described mode (47), the initial target deceleration value is determined on the basis of the present running condition of the vehicle including the vehicle running speed, so that the determined initial target deceleration value is adequate for the specific running speed of the vehicle. In this respect, it is noted that the vehicle deceleration value in the forward-drive mode varies with the vehicle running speed due to a running load of the vehicle, such that the deceleration value decreases with a decrease of the vehicle running speed. Accordingly, the arrangement to reduce the target deceleration value with a decrease of the vehicle running speed makes it possible to adequately control the actual deceleration value of the vehicle at a relatively high running speed of the vehicle, while preventing abrupt application of an excessively large braking force to the vehicle at a relatively low running speed of the vehicle. For instance, the initial target deceleration value is set to obtain the actual deceleration value which is equal to or slightly higher than the deceleration value obtained in the forward-drive mode, irrespective of the present running speed of the vehicle. Where a drive power source of the vehicle includes an engine, an engine brake is applied to the vehicle in the forward-drive mode during a coasting run without an operation of a vehicle accelerating member such as an accelerator pedal, such that the engine braking force varies with the running speed of the vehicle. In this respect, it is desirable to set the initial target deceleration value depending upon the specific running speed of the vehicle, so that the adequate engine braking force is obtained irrespective of the vehicle running speed.

(48) The deceleration control apparatus according to any one of the above-described modes (44)-(47), further comprising a deceleration-control-mode selecting device operable to select the deceleration control mode following the forward-drive mode, and wherein the initial-value setting portion is operable to set the initial value of the target deceleration value upon selection of the deceleration control mode following the forward-drive mode, such that the set initial value is equal to the initial value set by the initial-value setting portion upon selection of the deceleration control mode without once establishing the forward-drive mode.

In the deceleration control apparatus according to the above-described mode (48) wherein the deceleration-control-mode selecting device is provided to change the forward-drive mode to the deceleration control mode, the initial-value setting portion is arranged to set the initial target deceleration value upon selection of the deceleration control mode following the forward-drive mode, such that this initial target deceleration value is equal to the initial target deceleration value to be set upon selection of the deceleration control mode without once establishing the forward-drive mode. This arrangement permits adequate setting of the adequate initial target deceleration value irrespective of whether the deceleration control value is selected following the forward-drive mode or without once establishing the forward-drive mode, so that the actual deceleration value of the vehicle is suitably controlled so as to prevent an uncomfortable abrupt increase of the braking force to the vehicle.

(49) The deceleration control apparatus according to any one of the above-described modes (44)-(48), wherein the vehicle includes an automatic transmission having a plurality of forward-drive gear positions having respective different speed ratios, and the forward-drive mode is a wide-range automatic shifting mode in which the automatic transmission is automatically shiftable to one of gear positions which are selected from the above-indicated plurality of forward-drive gear positions and the number of which is larger than the numbers of the gear positions available in the other automatic shifting modes of the automatic transmission.

The deceleration control apparatus according to any one of the above-described modes (44)-(49) preferably comprises a deceleration-control-mode selecting device operable to select the deceleration control mode without once establishing the forward-drive mode. For instance, the deceleration-control-mode selecting device includes a deceleration-control-mode selector switch manually operable by the vehicle operator independently of a shift lever provided for controlling a shifting action of an automatic transmission. In this case, the forward-drive mode is switched to the deceleration control mode, that is, the deceleration control mode is selected following the forward-drive mode, when the deceleration-control-mode selector switch is manually operated to its on state while the shift lever is placed in a forward-drive position selecting the forward-drive mode. When the shift lever is operated from a power disconnecting position such as a neutral position to the forward-drive position while the deceleration-control-mode selector switch is in the on state, the deceleration control mode is selected or established without once establishing the forward-drive mode. In this case, for example, the initial target deceleration value is set as described above with respect to the modes (44) and (46).

As described above with respect to the mode (49), the forward-drive mode may be a wide-range automatic shifting mode which is selected when the shift lever is placed in a wide-range-shifting forward-drive position in which the automatic transmission is automatically shiftable to one of gear positions which are selected from the above-indicated plurality of forward-drive gear positions and the number of which is larger than the numbers of the gear positions available in other automatic shifting modes of the automatic transmission. As described above, the deceleration control mode is selected without once establishing the wide-range automatic shifting mode, when the shift lever is operated from the above-indicated power disconnecting position (e.g., neutral position) to the wide-range-shifting forward-drive position after the deceleration-control-mode selecting device is operated to select the deceleration control mode. The deceleration control mode is selected without once establishing the wide-range automatic shifting mode, also when the shift lever is operated from one of limited-range-shifting forward-drive positions for selecting the above-indicated other automatic shifting modes (shifting mode other than the wide-range automatic shifting mode), to the wide-range-shifting forward-drive position after the deceleration-control-mode selecting device is operated. In either of those two cases, the initial target deceleration value is set on the basis of the reference value obtained in the wide-range automatic shifting mode as described above with respect to the mode (44) or according to the present running speed of the vehicle as described above with respect to the mode (46). The initial target deceleration value may be set to be higher when the shift lever is operated from any limited-range-shifting forward-drive position to the wide-range-shifting forward-drive position, than when the shift lever is operated from the power disconnecting position to the wide-range-shifting forward-drive position.

The shift lever for the automatic transmission may have a deceleration-control-mode selecting position which is provided to select the deceleration control mode and which is located adjacent to a forward-drive position for selecting the forward-drive mode. In this case, the shift lever is operated to the deceleration-control-mode selecting position via the forward-drive position. Where the forward-drive mode is established only when the shift lever is kept in the forward-drive position for more than a predetermined time, the deceleration control mode is selected without establishing the forward-drive mode, if the shift lever is not kept in the forward-drive position for more than the predetermined time before it is operated to the deceleration-control-mode selecting position. In this case, too, the initial-value setting portion of the target-deceleration-value control portion of the deceleration control apparatus is operable to set the initial target deceleration value as described above with respect to the mode (44) or (46).

The principle of the deceleration control apparatus according to the above-described mode (44) or (46) is applicable in any other cases wherein the shift lever is operated to the deceleration-control-mode selecting position via the forward-drive position.

In the deceleration control apparatus according to the above-described mode (48), the initial target deceleration value set by the initial-value setting portion when the deceleration control mode is selected following the forward-drive mode is equal to that set when the deceleration control mode is selected without once establishing the forward-drive mode. However, these initial target deceleration values set in the different conditions in which the deceleration control mode is selected or established may be different from each other. For instance, the initial target deceleration value set by the initial-value setting portion in the apparatus according to the above-described mode (44) is almost equal to the reference value obtained in the forward-drive mode when the deceleration control mode is selected without once establishing the forward-drive mode, but is slightly higher than the reference value when the forward-drive mode is changed to the deceleration control mode, that is, when the deceleration control mode is selected following the forward-drive mode.

Although the deceleration control apparatus according to the above-described mode (49) is applicable to the vehicle wherein the automatic transmission has the wide-range automatic shifting mode in which the automatic transmission is automatically shiftable to a selected one of forward-drive gear positions, the speed ratio of the automatic transmission in the forward-drive mode need not be variable, as long as the automatic transmission has the forward-drive mode. For instance, the automatic transmission has the forward-drive mode and a rear-drive mode which are selectively established by a suitable switching device.

The foregoing descriptions in paragraphs [0017]-[0040] and in paragraphs [0065]-[0069] are applicable to the above-described modes (44)-(49), where appropriate.

(50) A deceleration control apparatus for controlling a deceleration value of a vehicle such that a braking force to be applied to the vehicle is controlled in a deceleration control mode, by changing a target deceleration value of the vehicle in response to an operation of any one of a plurality of deceleration-value setting devices, the deceleration control apparatus being characterized in that at least one of the plurality of deceleration-value setting devices is operable to cancel the deceleration control mode.

In the deceleration control apparatus according to the above-described mode (50), the deceleration control mode in which the target deceleration value can be changed by the plurality of deceleration-value setting devices can be canceled by operating at least one of the deceleration-value setting devices. Thus, the deceleration control mode once established can be easily canceled, so that the ease of manipulation of the deceleration control apparatus is improved.

(51) The deceleration control apparatus according to the above-described mode (50), wherein the deceleration control mode is canceled when the target deceleration value has been reduced by an operation of at least one of the deceleration-value setting devices, to a value substantially equal to a value before initiation of control of the target deceleration value in the deceleration control mode.

In the deceleration control apparatus according to the above-described mode (51), the deceleration control mode is canceled when the target deceleration value changed according to the operation of the deceleration-value setting devices has been reduced to the value substantially equal to the value before the initiation of control of the target deceleration value in the deceleration control mode, that is equal to a value when the target deceleration value is not controlled in the deceleration control mode. According to this arrangement, the deceleration control mode is canceled after gradual reduction of the target deceleration value. The present arrangement is effective to prevent an abrupt change of the braking force such as a drive-power-source braking force to be applied to the vehicle.

(52) A deceleration control apparatus for controlling a deceleration value of a vehicle such that a braking force to be applied to the vehicle is controlled in a deceleration control mode, by changing a target deceleration value of the vehicle in response to an operation of a deceleration-value setting device, the deceleration control apparatus being characterized in that the deceleration control mode can be canceled by a selected one of a plurality of canceling methods in which the target deceleration value is changed in respective different manners before the deceleration control mode is eventually canceled.

In the deceleration control apparatus according to the above-described mode (52), the deceleration control mode can be canceled by a selected one of the different canceling methods. Thus, the deceleration control mode once established can be easily canceled, so that the ease of manipulation of the deceleration control apparatus is improved. Further, the target deceleration value is changed in a selected one of different manners before canceling of the deceleration control mode, depending upon the specific method of cancellation of the deceleration control mode, so that the braking force to be applied to the vehicle (a vehicle drive force) before cancellation of the deceleration control mode is adequately controlled depending upon the method of cancellation of the deceleration control mode. When a variation of the braking force is relatively small, the target deceleration value is immediately zeroed, and the deceleration control mode is canceled for early and smooth transition to a normal vehicle drive mode. When the variation of the braking force is relatively large, the target deceleration value is gradually reduced before eventual cancellation of the deceleration control mode, in order to reduce an abrupt change of the actual deceleration value upon termination of control of the target deceleration value, thereby ensuring a comfortable driving of the vehicle upon and after cancellation of the deceleration control mode.

(53) The deceleration control apparatus according to the above-described mode (52), comprising a deceleration-control-mode selecting device operable to select and cancel the deceleration control mode, and wherein the deceleration control mode can be canceled by a selected one of the deceleration-control-mode selecting device and the deceleration-value setting device, the target deceleration value before cancellation of the deceleration control mode by the deceleration-control-mode selecting device is gradually reduced.

In the deceleration control apparatus according to the above-described mode (53), the deceleration control mode is selected and canceled by the deceleration-control-mode selecting device, and can be cancelled by either the deceleration-control-mode selecting device or the deceleration-value setting device. When the deceleration control mode is canceled by the deceleration-control-mode selecting device, the target deceleration value before cancellation of the deceleration control mode is gradually reduced, in order to prevent an abrupt change of the braking force to be applied to the vehicle and ensure a comfortable driving of the vehicle, even if the deceleration-control-mode selecting device is operated to cancel the deceleration control mode when the target deceleration value is relatively high.

(54) A deceleration control apparatus for controlling a deceleration value of a vehicle wherein a braking force to be applied to the vehicle is controlled in a deceleration control mode according to a target deceleration value of the vehicle, the deceleration control apparatus being characterized in that the target deceleration value before cancellation of the deceleration control mode is gradually reduced.

In the deceleration control apparatus according to the above-described mode (54), the target deceleration value before cancellation of the deceleration control mode is gradually reduced, in order to prevent an abrupt change of the braking force to be applied to the vehicle and ensure a comfortable driving of the vehicle, even if a command to cancel the deceleration control mode is generated when the target deceleration value is relatively high.

(55) The deceleration control apparatus according to the above-described mode (53) or (54), wherein a pattern in which the target deceleration value before cancellation of the deceleration control mode is reduced gradually is determined by a running speed of the vehicle.

In the deceleration control apparatus according to the above-described mode (55), the target deceleration value before cancellation of the deceleration control mode is gradually reduced at a rate which varies with the vehicle running speed, for example, so that the control of the target deceleration value in the deceleration control mode can be terminated in a relatively short time while preventing an abrupt change of the braking force.

The deceleration-control-mode selecting device provided in the deceleration control apparatus according to the above-described mode (50) may include a shift lever for controlling a shifting action of an automatic transmission of the vehicle. In this case, the deceleration control mode is selected when the shift lever is operated to a deceleration-control-mode selecting position provided to select the deceleration control mode, and deceleration-value setting switches may be provided such that these switches are operated by movements of the shift lever from the deceleration-control-mode selecting position to respective positions for increasing and reducing the target deceleration value. Alternatively, the deceleration-control-mode selecting device may include a deceleration-control-mode selecting switch which is manually operated by the vehicle operator independently of an operation of the shift lever.

In the deceleration control apparatus according to the above-described mode (53), the deceleration control mode is cancelled by the deceleration-value setting device, for example, when the target deceleration value has been reduced by an operation of the deceleration-value setting device, to a value substantially equal to a value before initiation of control of the target deceleration value in the deceleration control mode, as described above with respect to the mode (51). In this case, the target deceleration value is almost zero upon cancellation of the deceleration control mode, so that the control of the target deceleration value may be immediately terminated.

The gradual reduction of the target deceleration value before cancellation of the deceleration control mode in the deceleration control apparatus according to the above-described mode (54) is effective particularly where the deceleration control mode is canceled by the deceleration-control-mode selecting device as described above with respect to the mode (53). However, the gradual reduction according to the above-described mode (54) is effective also where the deceleration control mode is canceled by an operation of the deceleration-value setting device as described above with respect to the above-described mode (50).

In the deceleration control apparatus according to the above-described mode (55), the rate of reduction of the target deceleration value before cancellation of the deceleration control mode may be changed according to the vehicle running speed, for example, such that the rate of reduction increases with an increase of the vehicle running speed, for instance. In the deceleration control apparatus according to the above-described mode (53) or (54) wherein the target deceleration value before cancellation of the deceleration control mode is gradually reduced, the rate of gradual reduction of the target deceleration value may increase with an increase of the target deceleration value at the time of generation of a command to cancel the deceleration control mode. Where the target deceleration value before cancellation of the deceleration control mode is reduced in steps, the number of the respectively steps or the lengths of time corresponding to the respectively steps may be changed depending upon the vehicle running speed.

The foregoing descriptions in paragraphs [0017]-[0040] and in paragraphs [0065]-[0069] are applicable to the above-described modes (50)-(55), where appropriate.

(56) A deceleration control apparatus for controlling a deceleration value of a vehicle, characterized by comprising (a) a deceleration-value setting device operable by an operator of the vehicle to set a target deceleration value of the vehicle, (b) a deceleration-control-mode selecting device operable to select a deceleration control mode in which the target deceleration value is controlled to control a braking force to be applied to the vehicle, according to an operation of the deceleration-value setting device, and (c) a deceleration-control limiting portion operable to limit a control of the target deceleration value in the deceleration control mode when an operation of the deceleration-control-mode selecting device to select the deceleration control mode and an operation of the deceleration-value setting device take place substantially concurrently with each other.

In the deceleration control apparatus according to the above-described mode (56), the control of the target deceleration value in the deceleration control mode is limited or restricted when the operation of the deceleration-control-mode selecting device to select the deceleration control mode and the operation of the deceleration-value setting device to set the target deceleration value take place substantially concurrently or simultaneously with each other. This arrangement prevents a complicated signal processing operation which would be necessary if the control of the target deceleration value were not limited when the selection of the deceleration control mode and the operation setting or change of the target deceleration value took place substantially concurrently with each other. Accordingly, the present deceleration control apparatus assures an adequate control of the deceleration value of the vehicle, without an undesirable control phenomenon due to the complicated signal processing operation, which would be felt uncomfortable to the operator of the vehicle.

(57) A deceleration control apparatus for controlling a deceleration value of a vehicle, characterized by comprising (a) a forward-drive-mode selecting device operable by an operator of the vehicle, to select a forward-drive mode for forward driving of the vehicle, (b) a deceleration-value setting device operable by the operator of the vehicle to set a target deceleration value of the vehicle, (c) a target-deceleration-value control portion operable to control the target deceleration value to control a braking force to be applied to the vehicle, according to the target deceleration value set by the deceleration-value setting device in the forward-drive mode, and (d) a deceleration-control limiting portion operable to limit a control of the target deceleration value when an operation of the forward-drive-mode selecting device to select the forward-drive mode and an operation of the deceleration-value setting device take place substantially concurrently with each other.

In the deceleration control apparatus according to the above-described mode (57) wherein the target deceleration value is controlled in response to an operation of the deceleration-value setting device in the forward-drive mode, without prior selection of a deceleration control mode, the control of the braking force is limited or restricted when the operation of the forward-drive-mode selecting device to select the forward-drive mode and the operation of the deceleration-value setting device to set the target deceleration value take place substantially concurrently or simultaneously with each other. This arrangement prevents a complicated signal processing operation which would be necessary if the control of the target deceleration value were not limited when the selection of the forward-drive mode and the setting or change of the target deceleration value took place substantially concurrently with each other. Accordingly, the present deceleration control apparatus assures an adequate control of the deceleration value of the vehicle, without an undesirable control phenomenon due to the complicated signal processing operation, which would be felt uncomfortable to the operator of the vehicle.

In the deceleration control apparatus according to the above-described mode (56), the target deceleration value of the vehicle may be set to a predetermined initial value to initiate the control of the target deceleration value upon selection of the deceleration control mode by the deceleration-control-mode selecting device, without an operation of the deceleration-value setting device. However, the setting of the initial target deceleration value upon selection of the deceleration control mode is not essential. Namely, the target deceleration value is controlled only when the deceleration-value setting device is operated by the vehicle operator after the deceleration control mode is selected by the deceleration-control-mode selecting device.

For example, the deceleration-control limiting portion provided in the deceleration control apparatus according to the above-described mode (56) is arranged to invalidate the operation of the deceleration-value setting device taking place substantially concurrently with the operation of the deceleration-control-mode selecting device, for inhibiting a change of the target deceleration value, and to validate only the operation of the deceleration-control-mode selecting device to establish the deceleration control mode. In this case, the initial value of the target deceleration value may or may not be set upon substantially concurrent operations of the deceleration-control-mode selecting device and the deceleration-value setting device, and the target deceleration value is permitted to be changed when the deceleration-value setting device is subsequently operated in the deceleration control mode. Where the initial target deceleration value is set to be zero, that is, set to be equal to a value to be obtained during a coasting run of the vehicle with an accelerator pedal being held in its non-operated position, the control of the target deceleration value is not practically permitted immediately after the selection of the deceleration control mode, and the practical control is permitted only when the deceleration-value setting device is subsequently operated.

The deceleration-control limiting portion may be arranged to temporarily inhibit a change of the target deceleration value according to the operation of the deceleration-value setting device, for a predetermined time after the moment of the substantially concurrent operations of the deceleration-control-mode selecting device and the deceleration-value setting device. Further, the deceleration-control limiting portion may be arranged to inhibit the selection of the deceleration control mode as well as the change of the target deceleration value.

The forward-drive-mode selecting device provided in the deceleration control apparatus according to the above-described mode (54) may include a shift lever which is manually operated to control a shifting action of a power transmission switching device such as an automatic transmission of the vehicle and which has a forward-drive position for selecting the forward-drive mode in which the power transmission switching device is mechanically placed in a forward-drive state for forward driving of the vehicle. Alternatively, the forward-drive-mode selecting device may be a switch which is manually turned on to electrically control the power transmission switching device so as to establish the forward-drive mode.

The forward-drive mode may be a wide-range automatic shifting mode described above with respect to the mode (49), or a full-range automatic shifting mode in which the automatic transmission is automatically shiftable to any one of all forward-drive positions.

For example, the deceleration-control limiting portion provided in the deceleration control apparatus according to the above-described mode (54) is arranged to invalidate the operation of the deceleration-value setting device taking place substantially concurrently with the operation of the forward-drive-mode selecting device, for inhibiting a change of the target deceleration value, and to inhibit the selection of a deceleration control mode. In this case, however, the operation of the forward-drive-mode selecting device to select the forward-drive mode is valid. In this forward-drive mode, the vehicle is preferably placed in a forward-drive state in which an engine brake is applicable to the vehicle, without an operation of an accelerator pedal. Upon a subsequent operation of the deceleration-value setting device, the deceleration control mode is established to initiate the control of the target deceleration value.

The deceleration-control limiting portion provided in the deceleration control apparatus according to the above-described mode (57) may be arranged to temporarily inhibit a change of the target deceleration value according to the operation of the deceleration-value setting device, for a predetermined time after the moment of the substantially concurrent operations of the forward-drive-mode selecting device and the deceleration-value setting device.

The substantially concurrent operations of the deceleration-control-mode selecting device or the forward-drive-mode selecting device and the deceleration-value setting device in the deceleration control apparatus according to the above-described mode (53) or (54) are interpreted to mean the operations of those two devices within a predetermined short length of time, for example, about one second, which operations may cause an undesirable control phenomenon associated with the deceleration value of the vehicle.

Where the deceleration-control-mode selecting device or the forward-drive-mode selecting device is operated during an operation of the deceleration-value setting device, these operations of the two devices are always dealt as substantially concurrent operations, irrespective of the moments of initiations of the two operations, and the control of the target deceleration value is limited by the deceleration-control limiting portion. That is, when the deceleration-value setting device is operated within a predetermined short time (e.g., about one second) after the moment of operation of the deceleration-control-mode selecting device or the forward-drive-mode selecting device, these operations are treated as the substantially concurrent operations.

The foregoing descriptions in paragraphs [0017]-[0040] and in paragraphs [0065]-[0069] are applicable to the above-described modes (56) and (57), where appropriate.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIG. 5 is a view indicating an example of modes of operation of the vehicular drive system of FIGS. 1A and 1B;

DETAILED DESCRIPTION OF THE PREFERRED EMBODIMENT

Figures 1A, 1B:
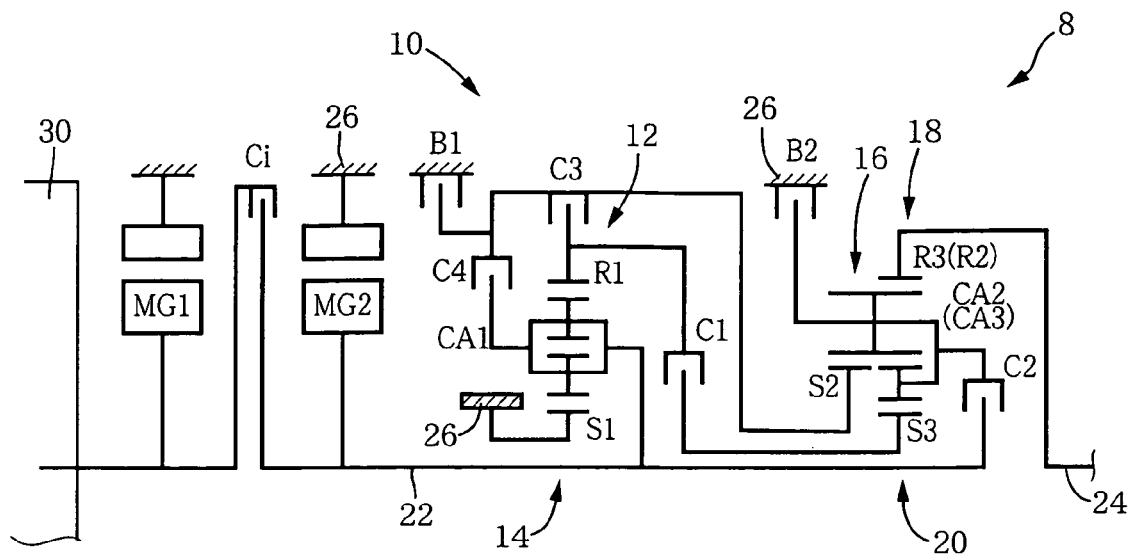
FIG. 1A is a schematic view illustrating a vehicular drive system to which the principle of the present invention is applicable.
FIG. 1B is a table indicating a relationship between gear positions of an automatic transmission of the drive system of FIG. 1A and combinations of operating states of hydraulically operated frictional coupling devices to establish the respective gear positions.

Referring to first to the schematic view of FIG. 1A, there is illustrated a basic arrangement of a vehicular drive system 8 of a hybrid vehicle to which the principle of the present invention is applicable. The drive system 8 includes an automatic transmission 10 having a plurality of gear positions which are established by respective combinations of the operating states (engaging and releasing actions) of hydraulically operated frictional coupling devices (which will be described). The drive system 8 further includes an engine 30 operable to produce a vehicle drive force by combustion of a fuel, a first electric motor MG1 and a second electric motor MG2. The drive system 8 is suitably installed on a front-engine rear-drive vehicle (FR vehicle) such that the axial direction of the engine 8 is parallel to the longitudinal or running direction of the vehicle, and such that the, engine 8, first and second electric motors MG1, MG2 and automatic transmission 10 are disposed coaxially with each other, in the order of description. The engine 30 and the second electric motor MG2 are primarily used as a drive-power source for driving the vehicle, while the first electric motor MG1 is primarily used as a engine starter motor and an electric generator. Each of the first and second electric motors MG1, MG2 is operable to function as both an electric motor and an electric generator. The first electric motor MG1 is operatively connected to the engine 30 through a damper (not shown), and an input clutch Ci is disposed between the first and second electric motors MG1, MG2, so that the engine 30 and the first electric motor MG1 can be selectively connected and disconnected to and from the second electric motor MG2 (input shaft 22). Since the first and second electric motors MG1, MG2 and the automatic transmission 10 are constructed symmetrically with respect to its axis, the lower half of the electric motors MG1, MG2 and automatic transmission 10 located below the axis is omitted in the schematic view of FIG. 1A.

As shown in FIG. 1A, the automatic transmission 10 includes a first transmission portion 14 constituted principally by a first planetary gear set 12 of a double-pinion type, and a second transmission portion 20 constituted principally by a second planetary gear set 16 of a single-pinion type and a third planetary gear set 18 of a double-pinion type. The first transmission portion 14 and the second transmission portion 20 are disposed coaxially with each other and are connected to an input shaft 14, and the second transmission portion 20 is connected to an output shaft 24, so that the speed of a rotary motion of the input shaft 22 is changed by the first and second transmission portions 14, 20, into the speed of a rotary motion of the output shaft 24. The input shaft 22 is an input member of the automatic transmission 10 and is integrally fixed to a rotor of the second electric motor MG2, while the output shaft 24 is an output member of the automatic transmission 10 and is operatively connected to right and left drive wheels of the vehicle through a propeller shaft and a differential gear device (which are not shown).

Figure 2:
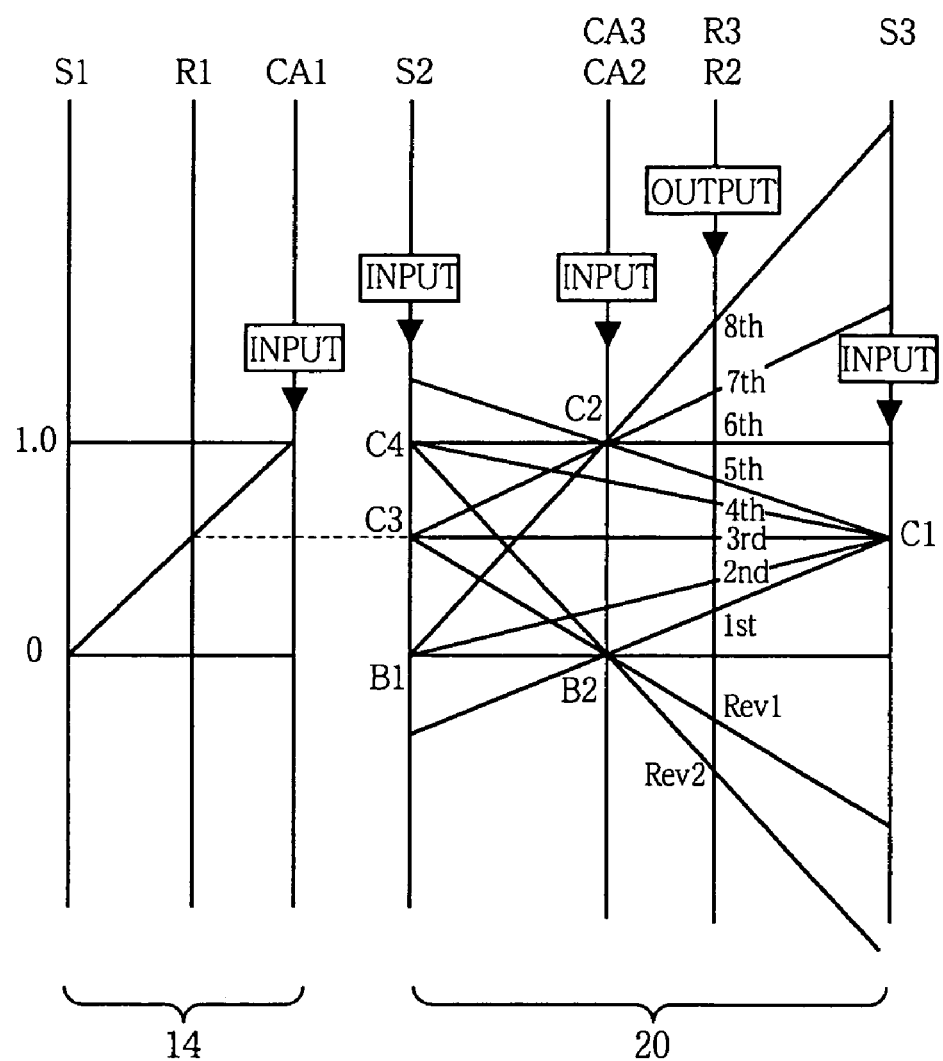
FIG. 2 is a collinear chart indicating relative rotating speeds of a plurality of rotary elements of the automatic transmission of the drive system of FIGS. 1A and 1B placed in each gear position.

The collinear chart of FIG. 2 indicates, by straight lines, the rotating speed of each element (sun gears S1-S3, carriers CA1-CA3 and ring gears R1-R3) of the first and second transmission portions 14, 20 in each of the gear positions of the automatic transmission 10. The collinear chart, has a lower horizontal straight line indicating the speed "0", and an upper horizontal straight line indicating the speed "1.0", namely, the rotating speed of the input shaft 22. The gear positions of the automatic transmission 10 include eight forward-drive gear positions "1st" through "8th" and two rear-drive gear positions "Rev1" and "Rev2", which are selected or established by the respective combinations of the engaged and released states of the hydraulically operated frictional coupling devices in the form of clutches C1-C4 and brakes B1, B2, as indicated in the table of FIG. 1B, in which "O" indicates the engaged state of the frictional coupling devices C1-C4, B1, B2. The speed ratios of the gear positions are determined by the gear ratios $\rho 1$, $\rho 2$ and $\rho 3$ of the first, second and third planetary gear sets 12, 16, 18. The gear ratio $\rho$ of each of the planetary gear sets 12, 16, 18 is equal to the number of teeth of the sun gear S divided by the number of teeth of the ring gear R. In FIG. 1A, reference numeral 26 denotes a transmission casing.

Figure 3:
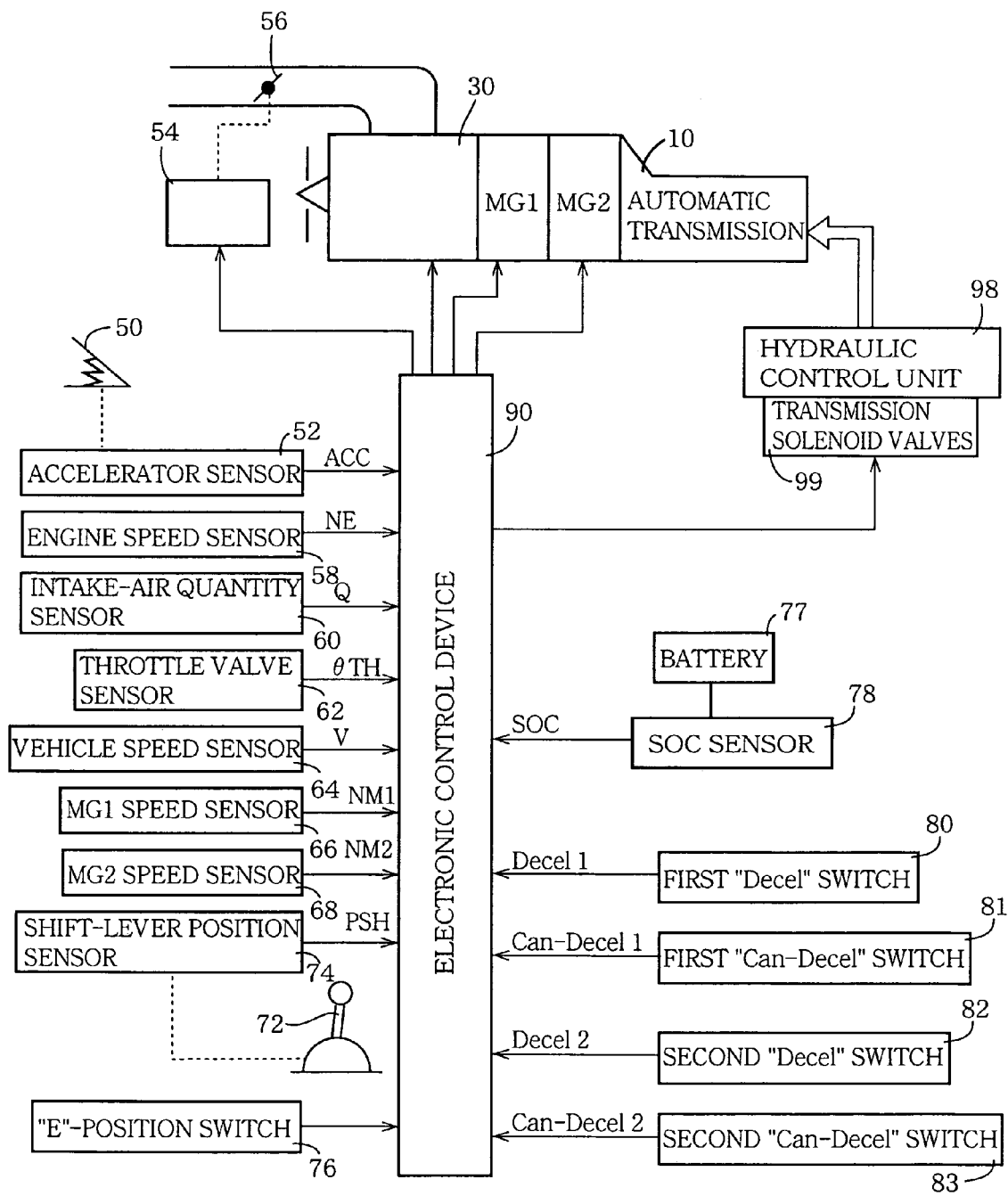
FIG. 3 is a block diagram showing major elements of a control system for controlling the vehicular drive system of FIGS. 1A and 1B.

Referring to the block diagram of FIG. 3 schematically illustrating a control system provided to control the automatic transmission 10, engine 30 and first and second electric motors MG1, MG2, the control system includes: an accelerator sensor 52 operable to detect a vehicle-operator's required output of the engine 30 in the form of an operating amount $A_{CC}$ of an accelerator pedal 50 functioning as a vehicle accelerating member; an engine speed sensor 58 operable to detect a speed NE of the engine 30; an intake-air quantity sensor 60 operable to detect an intake air quantity Q of the engine 30; a throttle valve sensor 62 equipped with an engine idling switch, which is operable to detect an opening angle $\theta_{TH}$ of an electronic throttle valve 56 (which is disposed in an intake pipe of the engine 30 and controlled by a throttle actuator 54), and a fully closed state of the electronic throttle valve (idling state of the engine 30); a vehicle speed sensor 64 operable to detect a speed V of the vehicle (rotating speed $N_{OUT}$ of the output shaft 24); an MG1 speed sensor 66 operable to detect an operating speed NM1 of the first electric motor MG1; an MG2 speed sensor 68 operable to detect a speed of the second electric motor MG2; a sift-lever position sensor 74 operable to detect a presently selected position $P_{SH}$ of a manually operable member in the form of a shift lever 72; an "E"-position switch operable to detect an operation of the shift lever 72 to an "E" position; an SOC sensor 78 operable to detect an amount SOC of an electric energy stored in a battery 77 connected to the first and second electric motors MG1, MG2; a first "Decel" switch 80 operable to generate a first increasing command "Decel1"; a first "Can-Decel" switch 81 operable to generate a first reducing command "Can-Decel1" command; a second "Decel" switch 82 operable to generate a second increasing command "Decel2"; and a second "Can-Decel" switch 83 operable to generate a second reducing command "Can-Decel2". The electronic control unit 90 receives output signals of those sensors and switches indicative of the accelerator operating amount $A_{CC}$, engine speed NE, intake-air quantity Q, throttle opening angle $\theta_{TH}$, vehicle speed V, speed NM1 of the first electric motor, speed NM2 of the second electric motor MG2, shift lever position $P_{SH}$, operation of the shift lever 72 to the "E" position, stored electric energy amount SOC of the battery 77, and generation of commands "Decel1", "Can-Decel1", "Decel2" and "Can-Decel2".

The electronic control device 90 is constituted principally by a so-called microcomputer incorporating a CPU (central processing unit), a RAM (random-access memory), a ROM (read-only memory) and an input-output interface. The CPU operates to perform signal processing operations according to control programs stored in the ROM, while utilizing a temporary data storage function of the RAM, for controlling the shifting operation of the automatic transmission 10, drive-torque/regenerative-torque controls of the first and second electric motors MG1, MG2, for running of the vehicle in a selected one of a plurality of different modes of operation in which the engine 30 and the first and second electric motors MG1, MG2 are operated in different states, as indicated in the table of FIG. 5, by way of example. The different modes of operation include an engine drive mode, an engine+motor drive mode, a motor drive mode, and a deceleration control mode. In the engine drive mode, the input clutch Ci is engaged to connect the engine 30 to the input shaft 22, for driving the vehicle with a drive force produced by the engine 30. When the engine 30 is able to produce an output sufficient to operate the first electric motor MG1 as the electric generator, as well as to drive the vehicle, the first electric motor MG1 is controlled to be operated as the electric generator to generate an electric energy for charting the battery 77, if necessary. In the engine+motor drive mode, the input clutch Ci is also engaged to connect the engine 30 to the input shaft 22, and the second electric motor MG2 is operated so as to cooperate with the engine 30 to drive the vehicle. In the motor drive mode, the input clutch Ci is released to disconnect the engine 30 from the input shaft 22, and the second electric motor MG2 is operated to drive the vehicle. As indicated above, the engine 30 is operated to drive the first electric motor MG1 to generate an electric energy for charging the battery 77, if the electric energy amount SOC stored in the battery 77 is reduced below a lower limit. In the deceleration control mode, the input clutch Ci is also engaged to connect the engine 30 to the input shaft 22, but a fuel supply to the engine 30 is stopped to effect a fuel-cut control of the engine 30, with a result of generation of an engine braking toque to the vehicle, and a drive-torque/regenerative-torque control of the second electric motor MG2 is implemented, for applying an overall drive-power-source brake to the vehicle. In the deceleration control mode, a drive-torque/regenerative-torque control of the first electric motor MG1 may be effected in addition to that of the second electric motor MG2.

Figure 6:
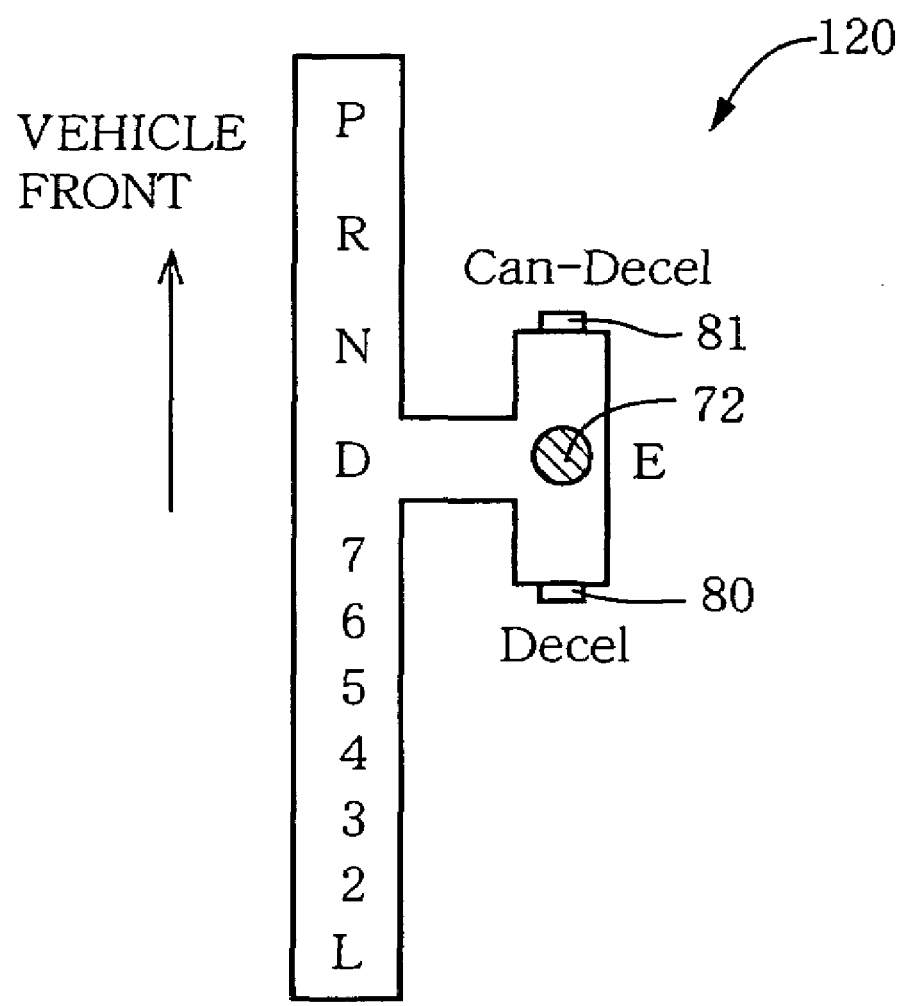
FIG. 6 is a view illustrating an example of operating positions of a shift lever shown in FIG. 3.

The automatic transmission 10 is automatically shifted under the control of the electronic control device 90, according to the presently selected position $P_{SH}$ of the shift lever 72. The shift lever 72 is disposed near a vehicle-operator's seat of the vehicle (e.g., at the position of a center console of the vehicle), and has 11 positions: parking position P; reverse position R; neutral position N; drive position D; seventh-gear position 7; sixth-gear position 6; fifth-gear position 5; fourth-gear position 4; third-gear position 3; second-gear position; and low-gear position L, as shown in FIG. 6. These 11 positions are spaced from each other in the longitudinal direction of the vehicle. As described below, the shift lever 72 further has a deceleration-control-mode selecting position in the form of an "E" position. In the parking position P which is selected when the vehicle is parked, the automatic transmission 10 is placed in a power disconnecting state. In response to an operation of the shift lever 72 to the parking position P. a suitable parking lock mechanism is operated to mechanically lock the output shaft 24 for locking the drive wheels. In the reverse position R which is selected to drive the vehicle in the backward or reverse direction, the automatic transmission 10 is placed in the rear-drive gear position "Rev1" or "Rev2" indicated above, as a result of a mechanical switching action of a manual valve provided in a hydraulic control unit 98 shown in FIG. 3 in response to an operation of the shift lever 72 to the reverse position R. In the neutral position N, the automatic transmission 10 is placed in the power disconnecting state with all of the clutches C1-C4 and brakes B1, B2 being held in the released state as a result of a mechanical switching action of the manual valve in response to an operation of the shift lever 72 to the neutral position N.

The drive position D is selected to drive the vehicle in the forward direction with an automatic shifting action of the automatic transmission 10 to a selected one of the forward-drive gear positions "1st" through "8th". In response to an operation of the shift lever 72 to the drive position "D", which is detected by an output signal of the shift lever position sensor 74, the manual valve is mechanically switched to electrically establish a shift range "D" in which the automatic transmission 10 is automatically shifted to a selected one of the eight forward-drive gear positions "1st" through "8th", depending upon the running condition of the vehicle, with the appropriate combination of the clutches C1-C4, brakes B1, B2 being brought into the engaged state, as indicated in the table of FIG. 1B, by selective energization and de-energization of solenoid coils of transmission solenoid valves (linear solenoid valves) 99 provided in the hydraulic control unit 98. For instance, the automatic transmission 10 is automatically shiftable to the selected one of the eight forward-drive gear positions "1st" through "8th", on the basis of the detected vehicle speed V and operated amount $A_{CC}$ of the accelerator pedal 50, and according to a predetermined shifting boundary line map which is stored in the ROM of the electronic control device 90 and which represents shift-up boundary lines indicated by solid lines in FIG. 8 and shift-down boundary lines indicated by broken lines in FIG. 8. The shifting boundary line map is formulated so that the automatic transmission 10 is shifted down to increase the speed ratio, as the vehicle speed is lowered and/or as the operating amount $A_{CC}$ of the accelerator pedal 50 is increased.

Figures 8, 9:
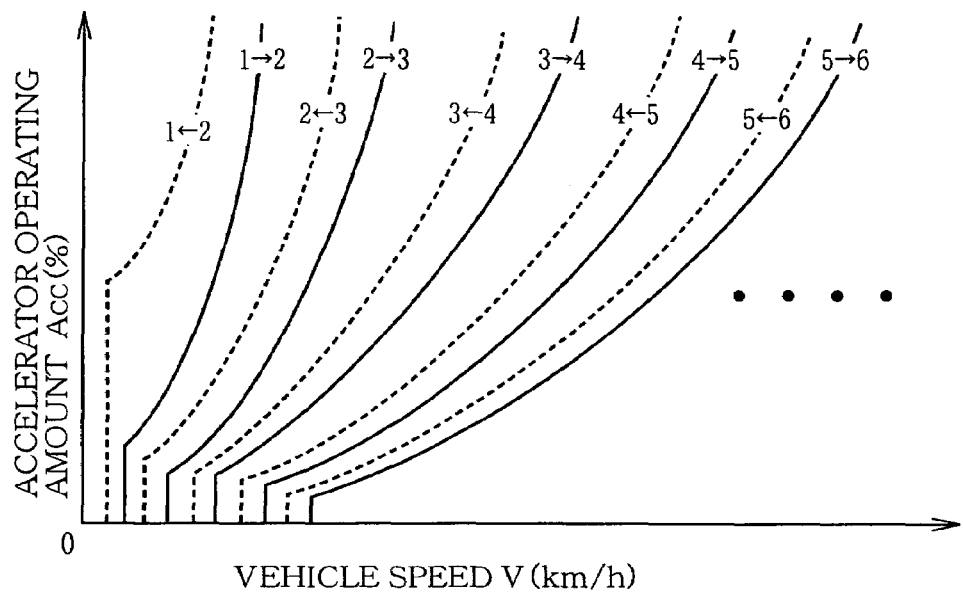
FIG. 8 is a view indicating an example of shift-up and shift-down boundary lines represented by a shifting boundary line map used for automatic shifting of the vehicular automatic transmission of the drive system of FIGS. 1A and 1B according to a running state of the vehicle.
FIG. 9 is a view for explaining the gear positions of the automatic transmission available in each of a plurality of shift ranges selectable by the shift lever.

As shown in FIG. 6, the above-indicated 11 positions of the shift lever 72 which are spaced from each other in the longitudinal direction of the vehicle further include seven manually selectable shift positions "7", "6", "5", "4", "3", "2" and "L" for selecting respective seven shift ranges "7", "6", "5", "4", "3", "2" and "L" in which respective different numbers of gear positions of the automatic transmission 10 are available for automatic shifting on the basis of the detected vehicle condition and according to the shifting boundary line map of FIG. 8, as indicated in FIG. 9. For example, the automatic transmission 10 is automatically shiftable to a selected one of the seven forward-drive gear positions "1st" through "7th" when the shift lever 72 is placed in the shift position "7" to select the shift range "7", and to a selected one of the four forward-drive gear positions "1s" through "4th" when the shift lever 62 is placed in the shift position "4" to select the shift range "4". When the shift lever 72 is placed in the shift position "L" selecting the shift range "L", the automatic transmission 10 is automatically shiftable to only the first gear position "1st". Thus, the first gear position "1st" (lowest gear position) having the highest speed ratio is available in all of the shift ranges "D" through "L", and the highest gear position having the lowest speed ratio changes in steps from the gear position "8th" toward the gear position "1st" as the selected shift position (selected shift range) changes from the drive position "D" (drive range "D") toward the shift position "L" (shift range "L"), that is, as the shift lever 72 is operated from the drive position "D" toward the shift position "L". Namely, the numbers of the gear positions available for automatic shifting of the automatic transmission 10 is decremented as the shift lever 72 is operated from the drive position "D" toward the shift position "L". According to this arrangement, sequential operations of the shift lever 72 from the drive position "D" to the shift position "5" through the shift positions "7" and "6" during running of the vehicle on a downhill road, for instance, cause sequential changes of the selected shift range from "D" to "5" through "7" and "6", so that the automatic transmission 10 is automatically sequentially shifted down from the eighth gear position "8th" to the sixth gear position "6th" through "7th" and "6th". The shift range "D" in which all of the eight forward-drive gear positions "1st" through "8th" are available for automatic shifting of the automatic transmission 10 is referred to as a "first forward-drive shift range", while each of the shift ranges "L" through "7" in which the highest gear position "8th" is not available is referred to as a "second forward-drive shift range".

The above-indicated "E" position (deceleration-control-mode selecting position) of the shift lever 72 which is located laterally of the drive position "D", more precisely, on the side of the drive position "D" which is nearer to the vehicle-operator's seat, is a position for selecting the deceleration control mode of the engine 30 and the electric motors MG1, MG2 indicated in the table of FIG. 5. An operation of the shift lever 72 to this "E" position is detected by the "E" position switch 76. As shown in FIG. 6, the shift lever 72 further has a "Decel" position for increasing the target deceleration value of the vehicle, and a "Can-Decel" position for reducing the target deceleration value. These "Decel" and "Can-Decel" positions are located on the respective front and rear sides of the "E" position. Operations of the shift lever 72 to the "Decel" and "Can-Decel" positions are respectively detected by the above-indicated first "Decel" and "Can-Decel" switches 80, 81, which generate the first increasing command "Decel1" and first reducing command "Can-Decel1" to be applied to the electronic control device 90. In the deceleration control mode selected by operating the shift lever 72 to the "E" position for controlling the target deceleration value of the vehicle by controlling the magnitude of the drive-power-source brake to the vehicle, the shift lever 72 is operated backwards from the "E" position to the "Decel" position when the vehicle operator desires to increase the deceleration value, that is, to apply a relatively abrupt or large drive-power-source brake to the vehicle, or operated forwards from the "E" position to the "Can-Decel" position when the vehicle operator desires to reduce the deceleration value, that is, to apply a relatively slow or small drive-power-source brake to the vehicle.

The shift lever 72 once operated to the "E" position is held in the "E" position by suitable biasing means such as a spring, and is manually operable in the longitudinal direction of the vehicle from this neutral position "E" to either the "Decel" position or the "Can-Decel" position against the biasing action of the biasing means. When the shift lever 72 is released when it is placed in the "Decel" or "Can-Decel" position, the shift lever 72 is automatically returned to the "E" position under the biasing action of the biasing means, so that the first "Decel" switch 80 or the first "Can-Decel" switch 81 is automatically turned from its ON state to its OFF state. The first "Decel" and "Can-Decel" switches 80, 81 operable by the shift lever 72 to increase and reduce the target deceleration value cooperate to constitute a first deceleration-value setting device, while the "E" position switch 76 functions as a deceleration-control-mode selector switch. The shift lever 72 may be considered to cooperate with the switches 80, 81 to constitute the first deceleration-value setting device. The shift lever 72 and the "E" position switch 76 may be considered to cooperate to constitute a preliminary-deceleration-setting-mode selecting device manually operable to select a preliminary deceleration setting mode that must be established before the first decelerating-value setting device 72, 80, 81 is operable to set the target deceleration value.

Figure 7:
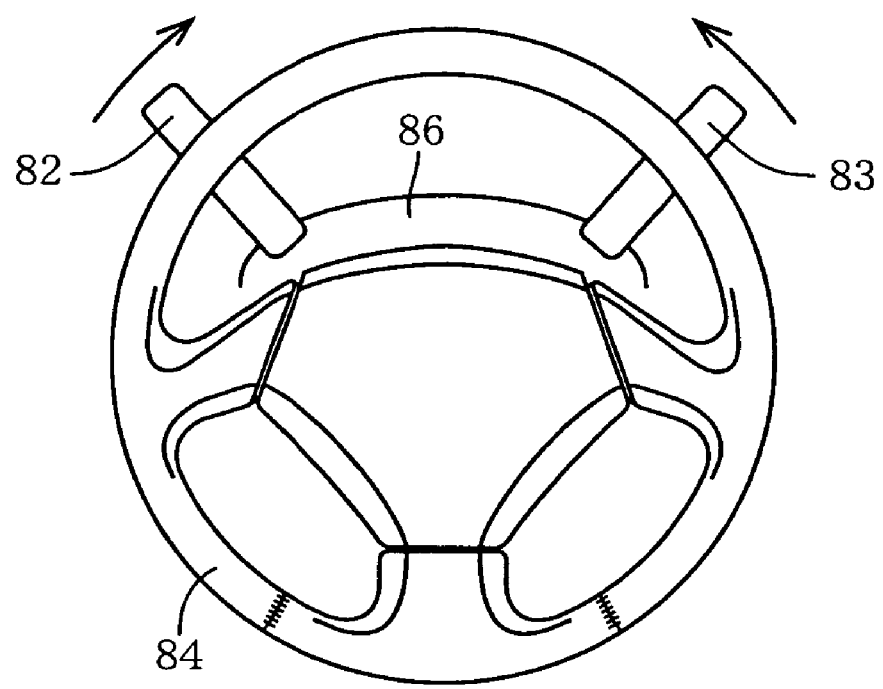
FIG. 7 is a view illustrating an example of a second "Decel" switch and a second "Can-Decel" switch which are provided on a steering column of the vehicle.

The deceleration control mode can be established upon operation of the above-indicated second "Decel" switch 82 when the shift lever 72 is placed in the drive position "D", as well as upon operation of the shift lever 72 to the "E" position. In the deceleration control mode established by operation of the second "Decel" switch 82, the target deceleration value of the vehicle can be controlled by the second "Decel" switch 82 and second "Can-Decel" switch 83. These switches 82, 83 are disposed on a portion of a steering column 86 located near a steering wheel 84 of the vehicle, as shown in FIG. 7, such that the switches 82, 83 are pivotally movable from their OFF position to their ON position, in the directions indicated by arrows in FIG. 7. When the second "Decel" and "Can-Decel" switches 82, 83 are operated to their ON position, the respective second increasing and reducing commands "Decel2" and "Can-Decel2" are generated and applied to the electronic control device 90, so that the target deceleration value is increased or reduced. The second "Decel" and "Can-Decel" switches 82, 83 are self-resetting switches which are automatically reset to their OFF position by springs or any other biasing means, and are located for easy operation by the forefingers of the left and right hands of the vehicle operator even while the vehicle operator is manipulating the steering wheel 84. The second "Decel" and "Can-Decel" switches 82, 83 constitute as a second deceleration-value setting device.

Figure 4:
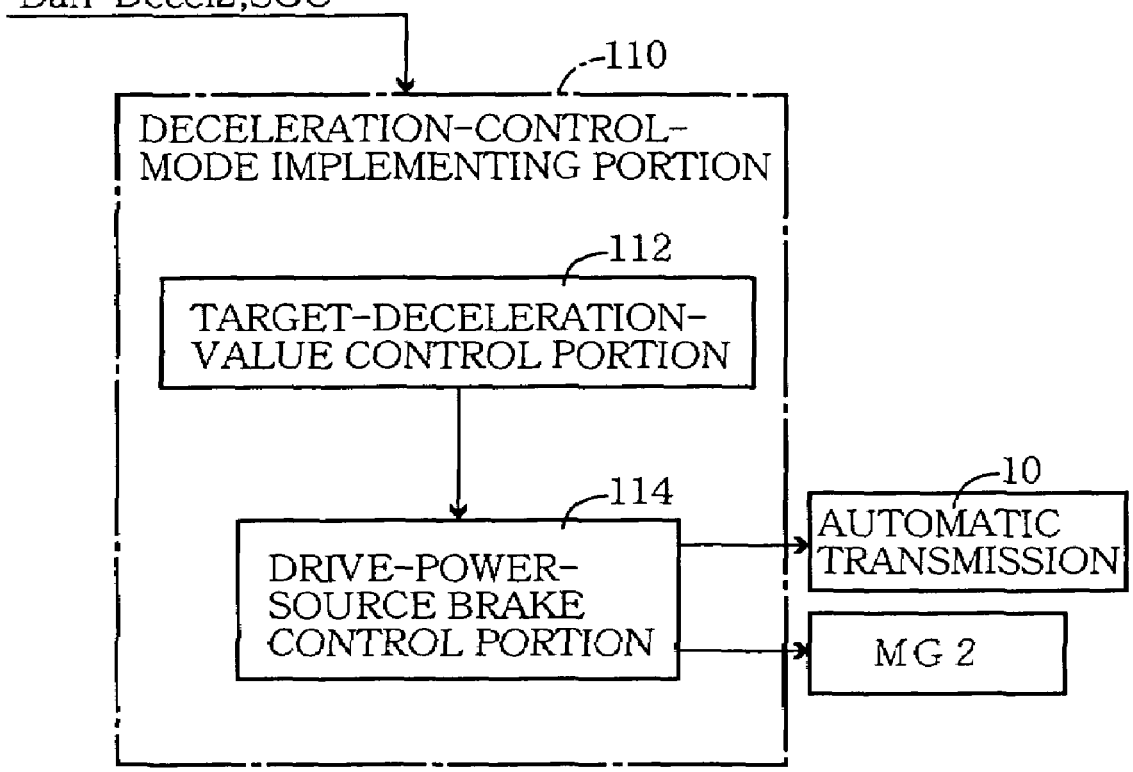
FIG. 4 is a block diagram for explaining functional portions of the control system of FIG. 3 for controlling a deceleration value of the vehicle.

The target deceleration value of the vehicle is controlled in the deceleration control mode by a deceleration control apparatus according to the present invention, which includes a deceleration-control-mode implementing portion 110 of the electronic control device 90 shown in the block diagram of FIG. 4. The deceleration control apparatus further includes the above-described first and second deceleration-value setting devices 72, 82, 83 and deceleration-control-mode selector switch 76. This deceleration-control-mode implementing portion 110 is arranged to change the target deceleration value of the vehicle according to the first increasing and reducing commands "Decel1" and "Can-Decel1" generated by the first "Decel" and "Can-Decel" switches 80, 81 upon operations of the shift lever 72 to the respective positions "Decel" and "Can-Decel", and the second increasing and reducing commands "Decel2" and "Can-Decel2" generated by the second "Decel" and "Can-Decel" switches 82, 83 disposed on the steering column 86, upon operations of these switches 82, 83. The implementing portion 110 controls the drive-power-source braking torque (which is equal to a sum of the engine braking torque generated by the engine 30 and the regenerative braking torque generated by the second electric motor). The deceleration-control-mode implementing portion 110 includes a target-deceleration-value control portion 112 and a drive-power-source brake control portion 114, and is operable to execute a control routine illustrated in the flow charts of FIGS. 10 and 11. The target-deceleration-value control portion 112 is arranged to implement steps S2-S7 of the control routine, while the drive-power-source brake control portion 114 is arranged to implement step S8 of the control routine. The flow chart of FIG. 11 shows the details of the step S8 of the control routine illustrated in the flow chart of FIG. 10. The time chart of FIG. 16 indicates an example of changes of various parameters when the control routine of FIG. 10 is executed.

Figure 10:
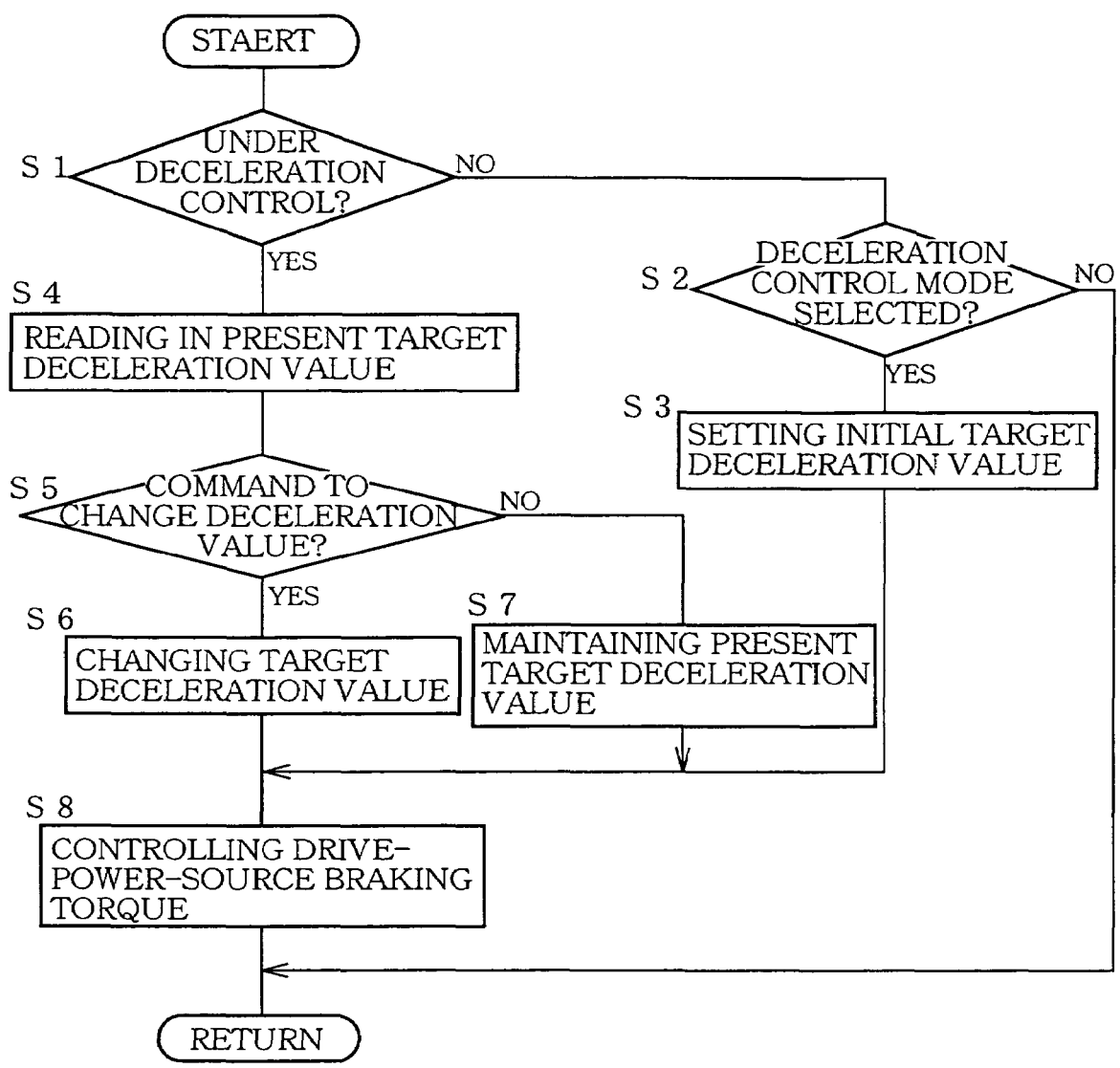
FIG. 10 is a flow chart illustrating a control routine executed by a deceleration-control-mode implementing portion shown in FIG. 4.
Figure 11:
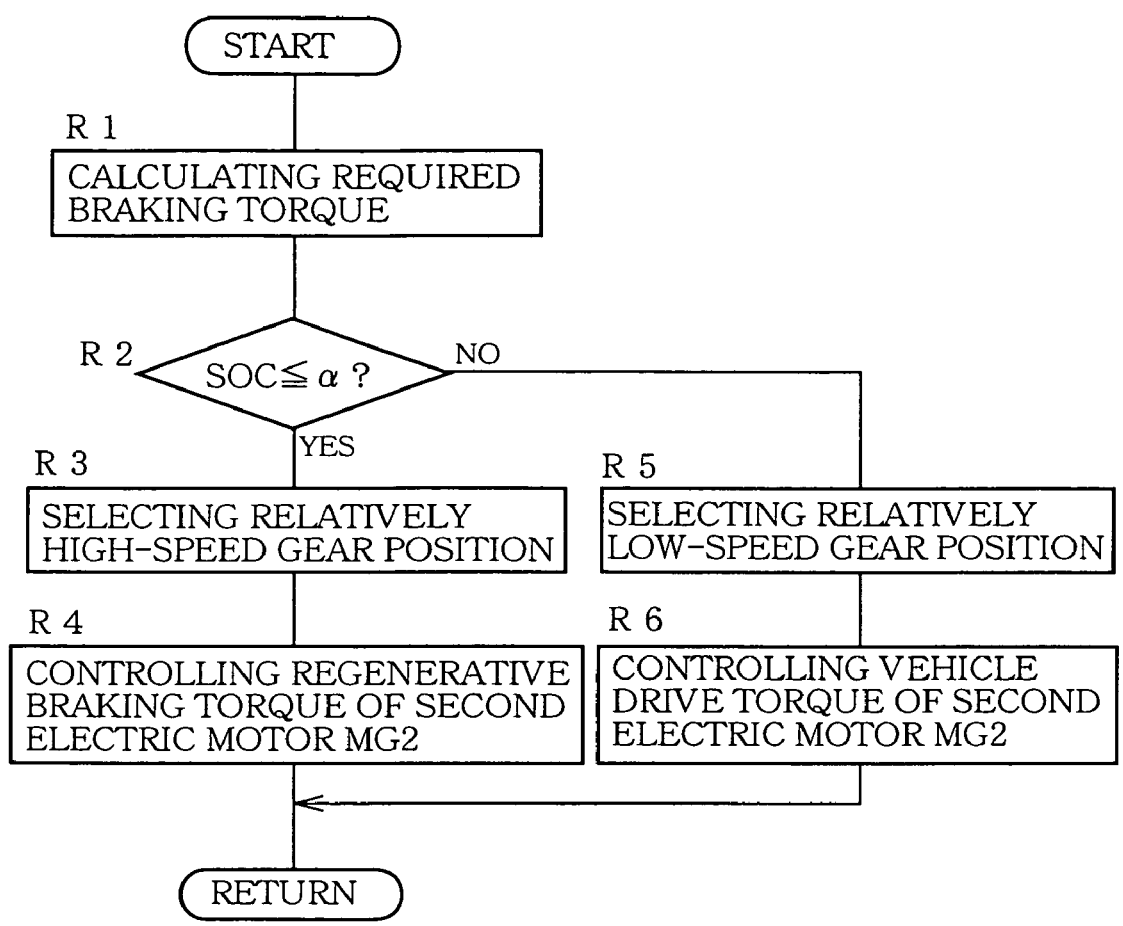
FIG. 11 is a flow chart for explaining in detail step S8 of the control routine of FIG. 10.

The control routine of FIG. 10 is executed while the shift lever 72 is placed in the drive position "D" or in the "E" position, and initiated with step S1 to determine whether the deceleration control mode has already been selected or established, that is, whether the control of the target deceleration value of the vehicle is being implemented. The determination in step S1 is made on the basis of a deceleration control flag which is set to "1" indicate that the deceleration control mode has been established. If an affirmative decision (YES) is obtained in step Si, the control flow goes to step S4. If a negative decision (NO) is obtained in step S1, the control flow goes to step S2 to determine whether the deceleration control mode is now selected. This determination in step S2 is made by determining whether the shift lever 72 has been operated from the drive position "D" to the "E" position, or the second "Decel" switch 82 has been operated to the ON position while the shift lever 72 is placed in the drive position "D". An affirmative decision (YES) is obtained in step S2 when the shift lever 72 has been operated to the "E" position, or when the second "Decel" switch 82 has been kept in the ON position for a relatively long time, that is, for at least a predetermined non-responsive or judgment time used as a threshold in step S5 (described below) which is formulated to determine whether any one of the first "Decel" and "Can-Decel" switches 80, 81 and the second "Decel" and "Can-Decel" switches 82, 83 has been operated to its ON position to change the target deceleration value. If the second "Can-Decel" switch 83 is operated, the deceleration control mode is not established, and a negative decision (NO) is obtained in step S2. In this case, one cycle of execution of the control routine is terminated.

While the second deceleration-value setting device 82, 83 is effective even when the shift lever 72 is not placed in the "E" position (even when the preliminary deceleration setting mode is not selected), the second deceleration-value setting device may be effective only when the preliminary deceleration setting mode is selected with the shift lever 72 placed in the "E" position (preliminary-deceleration-setting-mode selecting position).

Figure 12:
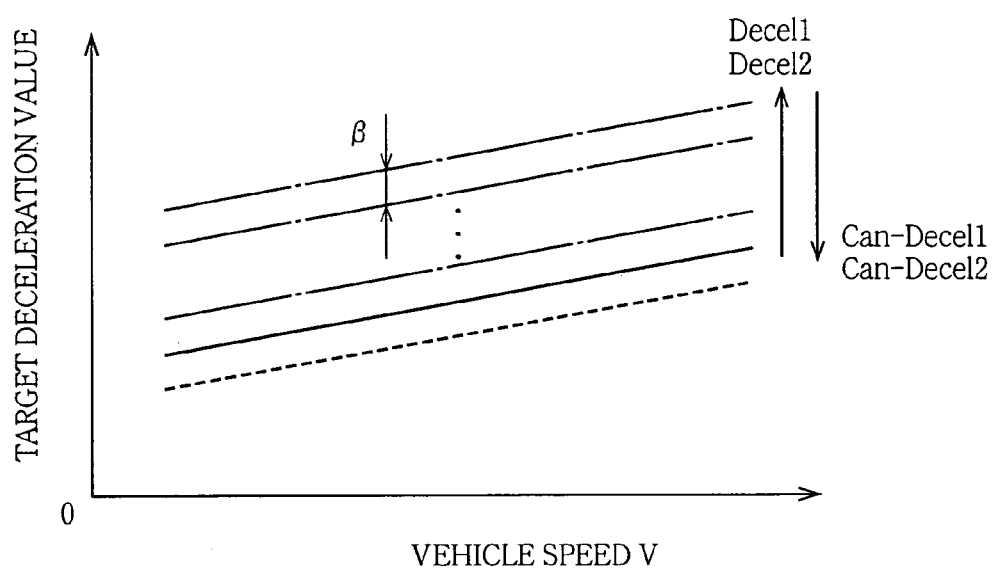
FIG. 12 is a view indicating an example of a data map for setting a target deceleration value of the vehicle in steps S3 and S6 of the control routine of FIG. 10.
Figure 13:
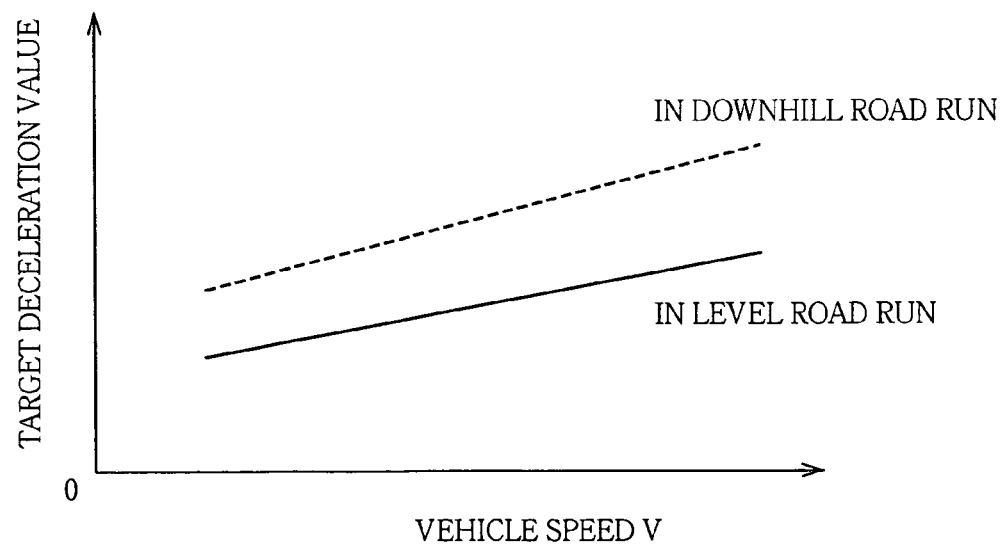
FIG. 13 is a view indicating an example of a data map for setting the target deceleration value while taking account of a gradient of a road surface on which the vehicle is run.

When an affirmative decision (YES) is obtained in step S2, the control flow goes to step S3 to set an initial value of the target deceleration value of the vehicle, and then to step S8 to control the drive-power-source braking torque according to the target deceleration value initially set in step S3. Described more specifically, the step S8 is formulated to control the engine braking torque by suitably shifting the automatic transmission 10 and by effecting the drive-torque/regenerative-torque control of the second electric motor MG2, and to set the deceleration control flag to "1" indicating that the control of the target deceleration value is being implemented. The initial value of the target deceleration value to be set in step S3 changes with an increase in the vehicle speed V, as indicated by solid line in FIG. 12, and is larger by a predetermined amount than a reference value of the target deceleration value which is indicated by broken line in FIG. 12. The reference target deceleration value is the value to be obtained when the control of the target deceleration value in the deceleration control mode is not implemented, namely, during a coasting run of the vehicle in the drive position "D" of the shift lever 72, without an operation of the accelerator pedal 50, and with the fuel-cut control of the engine 30 while only the engine brake is applied to the vehicle. That is, when the deceleration control mode is initially selected (with the affirmative decision obtained in step S2), the target deceleration value is set to the initial value according to the straight solid line of FIG. 12, and on the basis of the above-described reference value indicated by the straight broken line and the presently detected vehicle speed V The actual deceleration value while the control of the target deceleration value in the deceleration control mode is not implemented generally abruptly changes upon shifting actions of the automatic transmission 10 to change the gear position. The straight broken line indicated in FIG. 12 is obtained by smoothing the actually obtained data of the deceleration value while the target deceleration value is not controlled, and the straight solid line indicating the initial target deceleration value to be set in step S2, and straight one-dot chain lines also indicated in FIG. 12 indicating the target deceleration values to be set in step S6 (which will be described) are determined on the basis of the straight broken line. Those straight lines represent relationships between the target deceleration value and the vehicle speed, which are represented by respective data maps or mathematical equations stored in the ROM of the electronic control device 90. In the specific example shown in the time chart of FIG. 16, the deceleration control mode is selected at a point of time $t_1$, upon operation of the second "Decel" switch 82 to its ON position (upon generation of the second reducing command "Decel2"), and the initial value of the target deceleration value is set at this point of time $t_1$, so that a regenerative torque is generated by the second electric motor MG2 also at the point of time $t_1$. In the coating run of the vehicle without an operation of the accelerator pedal 50 with the shift lever 72 placed in the drive position "D" and without the control of the target deceleration value, the regenerative toque generated by the second electric motor MG2 is zero, and the reference target deceleration value (indicated by the broken line in FIG. 12) in this coasting run is equal to a torque of the engine braking torque generated by the engine 30 which is determined by the presently established gear position of the automatic transmission 10 and the presently detected vehicle speed V. Although the target deceleration value of the vehicle is changed according to the commands "Decel1", "Decel2", "Can-Decel1" and "Can-Decel2" and on the basis of the vehicle speed V, as indicated in FIG. 12, the gradient of the road surface on which the vehicle is running may also be taken into account, such that the target deceleration value in a vehicle run on a downhill road surface than that in a vehicle run on a level road surface, as indicated by broken and solid lines in the graph of FIG. 13.

If the affirmative decision (YES) is obtained in step S1, that is, if the control of the target deceleration value is being implemented, the control flow goes to step S4 to read in the present target deceleration value, and to step S5 to determine whether a change of the target deceleration value is presently required. As indicated above, the target deceleration value is changed according to the first increasing command "Decel1" or reducing command "Can-Decel1" generated when the shift lever 72 is operated to the position "Decel" or "Can-Decel", or when the second increasing or reducing command "Decel2" or "Can-Decel2" is generated by the second "Decel" or "Can-Decel" switch 82, 83 operated to the ON position. In the present embodiment, the step S5 is formulated to determine whether any one of the commands "Decel1", "Can-Decel1", "Decel2" and "Can-Decel2" has been present for at last the predetermined non-responsive time or judgment time. If an affirmative decision (YES) is obtained in step S5, the control flow goes to step S6 in which the target deceleration value is increased from the present value by a predetermined amount β where the first or second increasing command "Decel1" or "Decel2" is generated, or alternatively reduced from the present value by the predetermined amount β where the first or second reducing command "Can-Decel1" or "Can-Decel2" is generated. Step S6 is followed by the above-indicated step S8 in which the drive-power-source braking torque is controlled according to the updated target deceleration value. If a negative decision (NO) is obtained in step S5, the control flow goes to step S7 to maintain the present target deceleration value, and then to the step S8. While the predetermined amount β of change of the target deceleration value is constant in this embodiment, the amount of change may be changed on the basis of a suitable parameter such as the vehicle speed V, and/or the amount of increase and the amount of reduction may be different from each other. Further, the target deceleration value may be continuously changed according to the length of time during which the appropriate command "Decel1", "Decel2", "Can-Decel1" or "Can-Decel2" is present.

Figure 16:
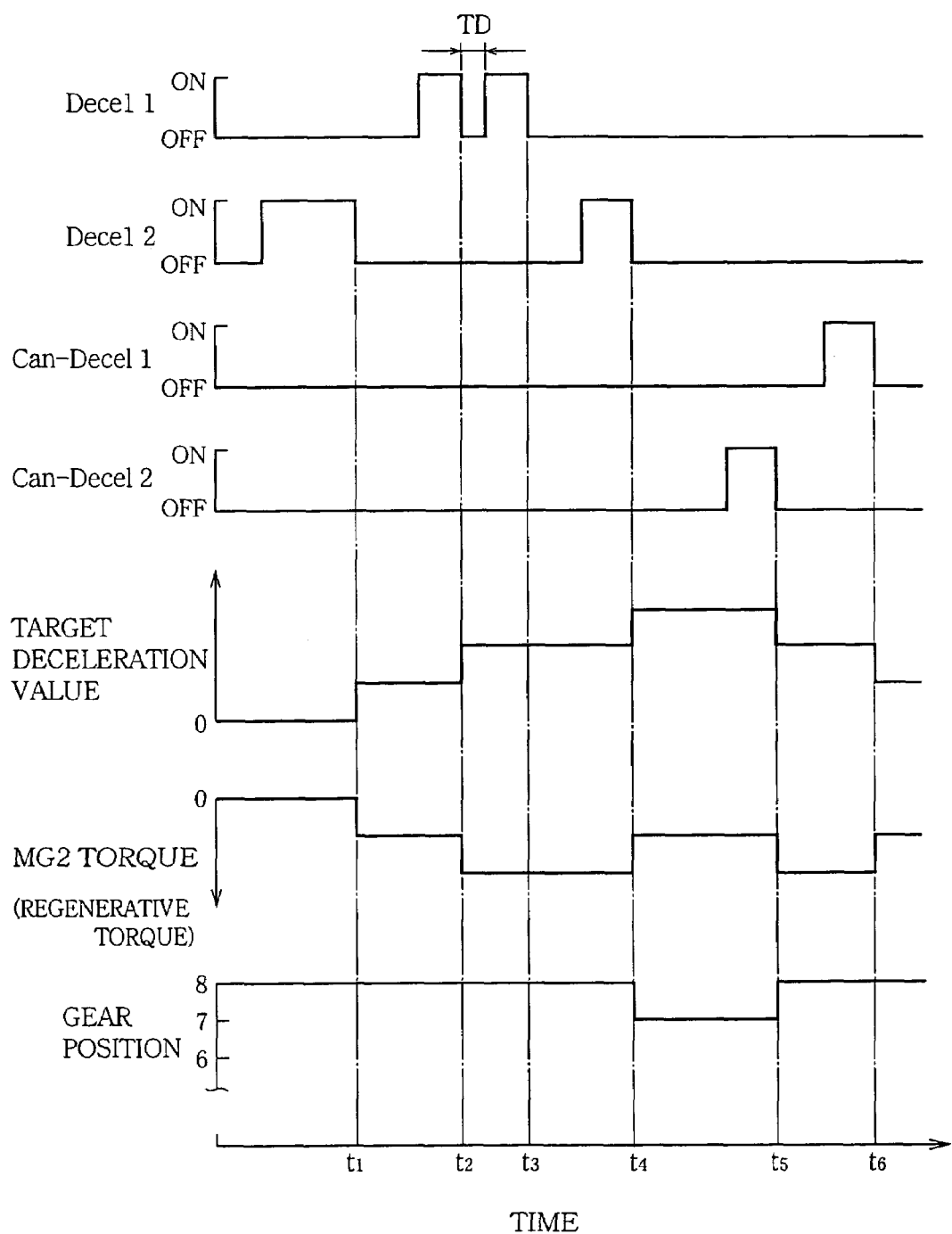
FIG. 16 is a time chart indicating an example of changes of various parameters when the control routine of FIGS. 10 and 11 is executed.

In the example of FIG. 16, the shift lever 72 is operated from the drive position "D" to the "E" position and then to the position "Decel" with a result of generation of the first reducing command "Decel1" and a consequent increase of the target deceleration value from the initial value by the predetermined amount β, at a point of time $t_2$, and the second "Decel" switch 82 on the steering column 86 is operated to the ON position with a result of generation of the second increasing command "Decel2" and a consequent further increase of the target deceleration value by the predetermined amount β at a point of time $t_4$. At a point of time $t_6$, the second "Can-Decel" switch 83 is operated to the ON position with a result of generation of the second reducing command "Can-Decel2" and a consequent decrease of the target deceleration value by the predetermined amount β. At a point of time $5_6$, the shift leer 72 is operated to the position "Can-Decel", with a result of generation of the first reducing command "Can-Decel1" by the first "Can-Decel" switch 81 and a consequent further decrease of the target deceleration value by the predetermined amount β. The predetermined amount β of change of the target deceleration value is smaller than an amount of change of the engine braking torque which takes place upon a down-down action of the automatic transmission 10, so that the drive-power-source braking torque can be intricately controlled by controlling the regenerative braking torque generated by the second electric motor MG2 and the engine braking torque controlled by controlling the shifting action of the automatic transmission 10. At the point of time $t_4$ at which the target deceleration value is increased by the predetermined amount β in response to the generation of the second increasing command "Decel2", the automatic transmission 10 is automatically shifted down from the eighth gear position "8th" to the seventh speed position "7th" with a result of an increase of the engine braking torque by an amount equal to 2β, but the regenerative braking torque generated by the second electric motor MG2 is reduced by the predetermined amount β, so that the drive-power-source braking torque is eventually increased by an amount corresponding to the predetermined amount β.

The above-indicated step S5 is formulated to ignore any of the increasing and reducing commands "Decel1", "Decel2", "Can-Decel1" and "Can-Decel2" if a time interval TD between the moment of present generation of this command and the moment of the last generation of the same command is shorter than a predetermined threshold time. This arrangement prevents an excessively large amount of change of the target deceleration value due to repeated operations of the shift leer 72 to the position "Decel" or "Can-Decel" or repeated operations of the second "Decel" or "Can-Decel" switch 82, 83. In the example of FIG. 16, the shift lever 72 is repeated operated to the position "Decel" with the time interval TD shorter than the threshold time, so that the second operation is ignored, whereby the negative decision (NO) is obtained in step S5 at the point of time $t_3$, and the present target deceleration value is maintained in step S7. The threshold time for the time interval TD also applies to the operation of the shift lever 72 to the position "Can-Decel" and the operations of the second "Decel" and "Can-Decel" switches 82, 83, so that an excessively large increase or decrease of the target deceleration value can be prevented. However, only the operation of the shift lever 72 to the position "Decel" and the operation of the second "Decel" switch 82 for increasing the target deceleration value may be ignored if the time interval is shorter than the threshold time, namely, the operation of the shift lever 72 to the position "Can-Decel" and the operation of the second "Can-Decel" switch 83 for reducing the target deceleration value may be made valid even if the time interval TD is shorter than the threshold. Other modifications relating to the steps S5-S8 may be made. For example, a change of the drive-power-source braking torque is not implemented in response to the first or second increasing command "Decel1", "Decel2", where a shift-down action of the automatic transmission 10 in response to this command causes an excessive increase of the engine speed NE or a change of the vehicle drive force and instability of the vehicle running behavior.

Figure 14:
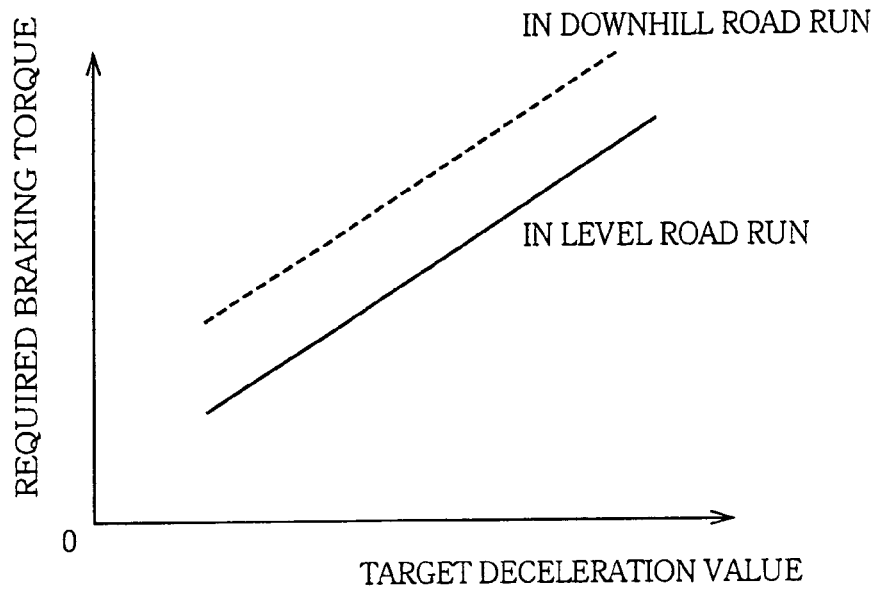
FIG. 14 is a view indicating an example of a data map for obtaining a required vehicle braking torque on the basis of the target deceleration value.

Referring to the flow chart of FIG. 11, the step S8 of the control routine of FIG. 10 will be described in detail. Initially, step R1 is implemented to calculate a required braking torque to be applied to the vehicle, on the basis of the target deceleration value set in steps S3, S6 and S7. The required braking torque is calculated on the basis of the target deceleration value and according to a predetermined relationship between the required braking torque and the target deceleration value, such that the required braking torque increases with an increase in the target deceleration value. For example, the predetermined relationship is represented by a straight solid line indicated in the graph of FIG. 14, which is represented by a data map or mathematical equation stored in the ROM of the electronic control device 90. Where the target deceleration value is set or determined (on the basis of the vehicle speed V) without taking into account the gradient of the road surface, the required braking torque is preferably calculated on the basis of the gradient of the road surface as well as the target deceleration value, such that the required braking torque is, larger in a downhill road run of the vehicle than in a level road run of the vehicle, as indicated by broken and solid lines in the graph of FIG. 14. Further, the required braking torque is preferably calculated such that the calculated required braking torque increases with an increase in a load acting on the vehicle, for example, in the weight of the vehicle or the number of occupants on board the vehicle. However, the required braking torque is calculated irrespective of a braking torque generated by a service brake system (e.g., hydraulically operated braking system) actuated upon operation of a manually operable brake operating member such as a brake pedal, and the drive-power-source braking torque is not changed depending upon the braking torque of the service brake.

Then, the control flow goes to step R2 to determine whether the amount SOC of the electric energy presently stored in the battery 77 is equal to or smaller than a predetermined threshold $\alpha$. When the amount SOC is equal to or smaller than the threshold $\alpha$, this means that the battery 77 can be charged by an electric energy generated by the second electric motor MG2. In this case, the control flow goes to step R3 to select a relatively high-speed one of the forward-drive gear positions "1st" through "8th" of the automatic transmission 10, so that a suitable engine braking torque is generated by the engine 30, and then goes to step R4 in which a regenerative braking torque generated by the second electric motor MG2 is controlled so that the calculated required braking torque is equal to a sum of the engine braking torque and the regenerative braking torque. When the amount SOC is larger than the threshold $\alpha$, this means that the battery 77 cannot be charged by an electric energy generated by the second electric motor MG2. In this case, the control flow goes to step R5 to select a relatively low-speed one of the forward-drive gear positions, so that a relatively large engine braking torque is generated by the engine 30, and then goes to step R6 in which a forward vehicle drive torque generated by the second electric motor MG2 is controlled so that the calculated required braking torque is equal to the engine braking torque minus the vehicle drive torque generated by the second electric motor MG2.

Figure 15:
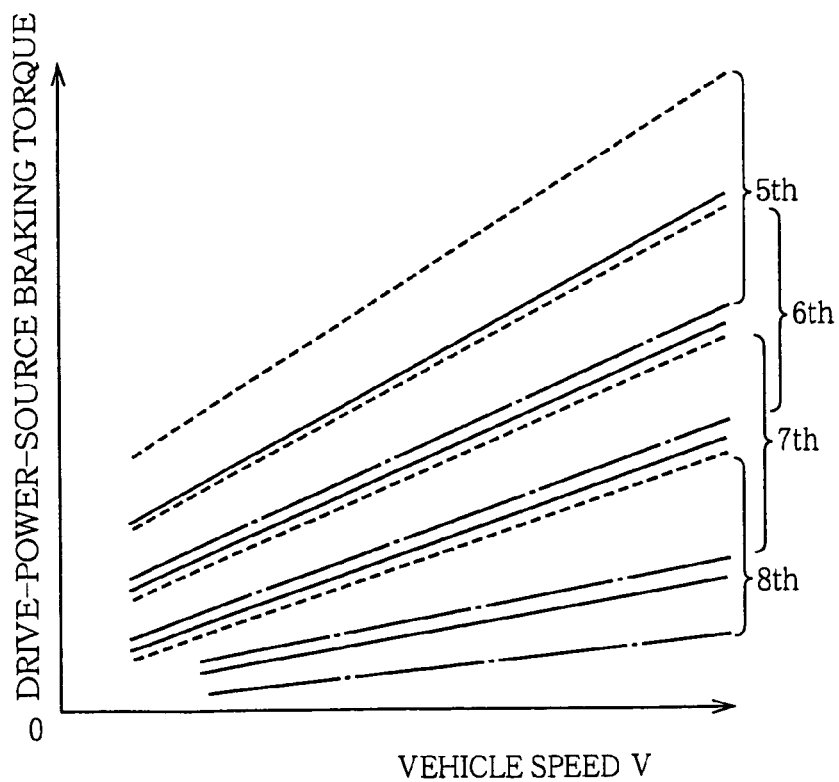
FIG. 15 is a view for explaining a drive-power-source brake which is obtained according to running speed of the vehicle, on the basis of an engine brake and a torque control of the electric motor.

Described more specifically, the drive-power-source braking torque is equal to a sum of the engine braking torque which changes with the selected one of the forward-drive gear positions of the automatic transmission 10, and the regenerative braking torque generated by the second electric motor MG2, or equal to the engine braking torque minus the forward vehicle drive torque generated by the second electric motor MG2. Solid lines indicated in the graph of FIG. 15 represent the engine braking torque generated in each forward-drive gear position of the automatic transmission 10, and broken lines in the graph represent a sum of the engine braking torque and the regenerative braking torque generated by the second electric motor MG2, while one-dot chain lines in the graph represent the engine braking torque minus the vehicle drive torque generated by the second electric motor MG2. Accordingly, each of the broken lines indicates the maximum value of the drive-power-source braking torque, while each of the one-dot chain lines indicates the minimum value of the drive-power-source braking torque. It will be understood that the range of the drive-power-source braking torque between its maximum and minimum values in each of the forward-drive gear positions of the automatic transmission 10 overlaps the range in the adjacent ones of the gear positions. For example, the range of the drive-power-source braking torque that can be obtained when the regenerative braking torque of the second electric motor MG2 is controlled while the automatic transmission 10 is placed in the seventh gear position "7th" overlaps the range of the drive-power-source braking toque that can be obtained when the vehicle drive torque of the second electric motor MG2 is controlled while the automatic transmission 10 is placed in the sixth gear position "6th". Accordingly, the control of the drive-power-source braking torque in step S8 illustrated in detail in the flow chart of FIG. 22 is formulated such that the second electric motor MG2 is controlled to generate a regenerative braking torque while charging the battery 77 when the battery 77 can be charged, and such that the automatic transmission 10 is shifted down to increase the engine braking torque while at the same time the second electric motor MG2 is controlled to generate a forward vehicle drive torque for partially offset the engine braking torque to obtain the desired drive-power-source braking torque corresponding to the required braking torque (target deceleration value), when the battery 77 cannot be charged with the stored electric energy amount SOC exceeding the threshold $\alpha$.

An additional control of the vehicle drive torque or regenerative braking torque of the first electric motor MG1 in addition to that of the second electric motor MG2 permits an enlargement of the range in which the drive-power-source braking torque can be controlled. In this case, the drive-power-source braking torque can be controlled by selecting an appropriate one of at least three of the forward-drive gear positions of the automatic transmission 10. This selection of the gear position from the at least three forward-drive gear positions may be made where the second electric motor MG2 has a considerably large torque capacity, as well as where the first electric motor MG1 is additionally controlled to obtain the desired drive-power-source braking torque. Although the steps R5 and R6 are formulated to shift down the automatic transmission 10 and control the second electric motor MG2 so as to generate the regenerative braking torque for partially offsetting the engine braking torque to obtain the desired drive-power-source braking torque, these steps may be modified to select a relatively high-speed gear position of the automatic transmission 10 and control the second electric motor MG2 so as to generate a reverse vehicle drive torque for adding this braking toque to the engine braking torque to thereby obtain the desired drive-power-source braking torque.

In the event where both of the first and second electric motors MG1, MG2 fail to normally operate, only the engine braking torque generated by controlling the shifting action of the automatic transmission 10 is used to provide a drive-power-source braking torque. Where an engine braking torque cannot be obtained, as in the event of releasing of the input clutch Ci due to a drop of the vehicle speed V, only the regenerative braking torque generated by the second electric motor MG2 is used to provide a drive-power-source braking torque.

Where the accelerator pedal 50 is depressed during the control of the deceleration value in the deceleration control mode, the regenerative torque control of the second electric motor MG2 is interrupted while the automatic transmission 10 is held in the presently selected gear position, and the output of the engine 30 is controlled according to the operating amount $A_{CC}$ of the accelerator pedal 50. Where the shift lever 72 is returned from the "E" position back to the drive position "D" to cancel the deceleration control mode, all controls to be implemented in the deceleration control mode are cancelled, and the automatic transmission 10 is automatically shifted to an appropriate one of the forward-drive gear positions on the basis of the vehicle condition and according to the shifting boundary line map illustrated in FIG. 8 by way of example, and the engine, 30 and the first and second electric motors MG1, MG2 are controlled according to the operating amount $A_{CC}$ of the accelerator pedal 50. The deceleration mode is also canceled when the target deceleration value is lowered to the lowest value (indicated by the broken line in FIG. 12) by operating the second "Can-Decel" switch 83 while the shift lever 72 is held in the drive position "D".

The deceleration control apparatus according to the present embodiment of this invention is arranged to deal with all of the four commands "Decel1", "Can-Decel1", "Decel2" and "Can-Decel2" in the same manner in step S5 of the control routine of FIG. 10, without a distinction between the first increasing and reducing commands "Decel1" and "Can-Decel1" that are generated when the shift lever 72 is operated to the positions "Decel" and "Can-Decel", and the second increasing and reducing commands "Decel2" and "Can-Decel2" that are generated when the second "Decel" and "Can-Decel" switches 82, 83 disposed on the steering column 86 are operated to their ON position. When any one of those four commands is generated, the target deceleration value of the vehicle can be increased or reduced to control the magnitude of the drive-power-source brake (drive-power-source braking torque), irrespective of the specific command generated. Further, successive operations of the shift lever 72 to generate the first command "Decel1" or "Can-Decel1" and the second "Decel" or "Can-Decel" switch 82, 83 to generate the second command "Decel2" or "Can-Decel2" permit successive changes of the target deceleration value, irrespective of whether the shift lever 72 or the second "Decel" or "Can-Decel" switch 82, 83 has been operated. Thus, the present deceleration control apparatus has a high degree of ease of setting of the target deceleration value by a plurality of deceleration-value setting devices in the form of the shift lever 72 and the switches 82, 83. For instance, the target deceleration value is controlled by operating the second "Decel" and "Can-Decel" switches 82, 83 on the steering column during a high-speed straight running of the vehicle, and by operating the shift lever 72 to the "Decel" and "Can-Decel" positions during a subsequent cornering run of the vehicle in which the vehicle operator is manipulating the steering wheel 84. In this case wherein the shift lever 72 and the switches 82, 83 are successively operated, the target deceleration value can be successively changed (increased or reduced) to suitably adjust the magnitude of the overall drive-power-source brake, such that the target deceleration value changed according to the operation of the shift leer 72 is subsequently changed according to the operation of the switch 82 or 83.

The present deceleration control apparatus is further arranged to obtain the desired drive-power-source braking torque by controlling the engine braking torque by suitably shifting the automatic transmission 10, and by controlling the vehicle drive torque or regenerative braking torque generated by the second electric motor MG2. This control arrangement permits a more intricate control of the deceleration value of the vehicle than where the desired-power-source braking torque is obtained by controlling the shifting action of the automatic transmission 10 to generate an engine braking torque. In this respect, it is noted in particular that the ranges of the drive-power-source braking torque available in the adjacent forward-drive gear positions overlap each other, so that the drive-power-source braking torque can be controlled by controlling the second electric motor MG2 to generate a regenerative braking torque while charging the battery 77 when the battery 77 can be charged, and by shifting down the automatic transmission 10 to increase the engine braking torque while at the same time controlling the second electric motor MG2 to generate a forward vehicle drive torque for partially offset the engine braking torque to obtain the desired drive-power-source braking torque, when the battery 77 is almost fully charged and cannot be further charged.

The present deceleration control apparatus is further arranged such that the initial value of the target deceleration value to be set in step S3 changes with an increase in the vehicle speed V, and is larger by the predetermined amount than the reference value, which is deceleration value when the control of the target deceleration value in the deceleration control mode is not implemented, namely, during a coasting run of the vehicle in the drive position "D" of the shift lever 72, without an operation of the accelerator pedal 50, and with the fuel-cut control of the engine 30 while only the engine brake is applied to the vehicle. This arrangement prevents a risk of a discomfort as felt by the vehicle operator due to an abrupt change of the vehicle deceleration value, and assures an adequate control of the deceleration value depending upon the vehicle speed. While the control of the target deceleration value in the deceleration control mode is not implemented, the target deceleration value decreases with a decrease of the vehicle speed V, as indicated by the broken line in FIG. 12. Accordingly, the target deceleration value upon initial selection of the deceleration control mode is set to the initial value according to the straight solid line of FIG. 12 such that the initial value decreases with a decrease of the vehicle speed V The present arrangement prevents an abrupt change of the deceleration value when the vehicle speed V is relatively low, and assures an adequate control of the deceleration value when the vehicle speed V is relatively high.

The reference deceleration value on which the initial value of the target deceleration value is set in step S3 is the deceleration value to be obtained when the shift lever 72 is placed in the drive range "D" in which all of the eight forward-drive gear positions "1st" through "8th" are available for automatic shifting of the automatic transmission 10. The use of this reference deceleration value permits increased adequacy of control of the deceleration value than the use of a reference deceleration value to be obtained when the shift lever 72 is placed in any one of the shift ranges "L" through "7" in which the number of the gear positions available for automatic shifting of the automatic transmission 10 is smaller than that in the drive range "D". That is, when the shift lever 72 is in any one of the shift ranges "L" through "7", the engine braking torque is generally larger than in the drive range "D" since the speed ratio of the highest-speed gear position available in any one of the shift ranges "L" through "7" is lower than that of the highest speed gear position "8th" available in the drive range "D". If the initial value of the target deceleration value is set on the basis of the reference value to be obtained in any one of the shift ranges "L"-"7", the deceleration value may be excessively larger than the optimum value, when the automatic transmission 10 is placed in the relatively high-speed gear position.

While the preferred embodiment of this invention have been described above in detail by reference to the accompanying drawings, for illustrative purpose only, it is to be understood that the present invention may be embodied with various changes, modifications and improvements, which may occur to those skilled in the art, in the light of the foregoing teachings.

What is claimed is:

1. A deceleration control apparatus for controlling a deceleration value of a vehicle, comprising:
    deceleration-value setting means including a plurality of deceleration-value setting devices operated by a user;
    a target-deceleration-value control portion operable to change a target deceleration value of the vehicle according to an operation of the deceleration-value setting means; and
    a brake control portion operable to control a braking force to be applied to the vehicle, according to the target deceleration value changed by the target-deceleration-value control portion, wherein
    said target-deceleration-value control portion is operable to successively change the target deceleration value of the vehicle in response to successive operations of one and another of said plurality of deceleration-value setting devices such that the target deceleration value, which is changed according to the operation of said one deceleration-value setting device by the user, is subsequently changed according to the operation of said another deceleration-value setting device by the user.

2. The deceleration control apparatus according to claim 1, wherein the vehicle includes a drive wheel, an engine and an electric motor which are operatively connected to said drive wheel, and further includes an automatic transmission disposed between said engine and said drive wheel, and
    wherein said brake control portion is operable to control a speed ratio of said automatic transmission for controlling an engine braking torque, and to control a torque generated by said electric motor, for thereby controlling said braking force to be applied to the vehicle.

3. The deceleration control apparatus according to claim 2, wherein said brake control portion is operable to control as said braking force a drive-power-source braking torque to be applied to the vehicle by said engine and said electric motor, such that said drive-power-source braking torque is equal to a sum of said engine braking torque and a regenerative torque generated by said electric motor.

4. The deceleration control apparatus according to claim 2, wherein said brake control portion is operable to control as said braking force a drive-power-source braking torque to be applied to the vehicle by said engine and said electric motor such that said drive-power-source braking torque is equal to said engine braking torque minus a forward vehicle drive torque generated by said electric motor.

5. The deceleration control apparatus according to claim 2, wherein said target-deceleration-value control portion is operable to change said target deceleration value in steps upon successive operations of each of said plurality of deceleration-value setting devices such that the target deceleration value is changed by a predetermined amount each time said each deceleration-value setting device is operated, said brake control portion controlling the speed ratio of said automatic transmission and the torque of said electric motor such that an amount of change of a deceleration value of the vehicle caused by an amount of change of the torque of the electric motor corresponding to said predetermined amount of change of said target deceleration value is smaller than an amount of change of the deceleration value caused by an amount of change of said engine braking toque corresponding to said predetermined amount of change of said target deceleration value.

6. The deceleration control apparatus according to claim 1, wherein said target-deceleration-value control portion is operable, in response to an operation of any one of said plurality of deceleration-value setting devices while said braking force is not being controlled by said brake control portion, to set said target deceleration value to an initial value on the basis of a reference deceleration value to be obtained upon the operation of said any one of said plurality of deceleration-value setting devices.

7. The deceleration control apparatus according to claim 1, wherein said target-deceleration-value control portion is operable, in response to an operation of any one of said plurality of deceleration-value setting devices while said braking force is not being controlled by said brake control portion, to set said target deceleration value to an initial value on the basis of a reference deceleration value which is determined by a running speed of the vehicle upon the operation of said any one of said plurality of deceleration-value setting devices.

8. The deceleration control apparatus according to claim 1, wherein the vehicle includes a drive wheel, an engine and an electric motor which are operatively connected to said drive wheel, and further includes an automatic transmission which is disposed between said engine and said drive wheel and which has a plurality of forward-drive gear positions, and said automatic transmission has a first forward-drive shift-range in which all of said plurality of forward-drive gear positions are available for automatic shifting of the automatic transmission, and at least one second forward-drive shift range in which at least one high-speed gear position selected from among said plurality of forward-drive gear positions is not available for automatic shifting of the automatic transmission, and
    wherein said brake control portion is operable to control the speed ratio of said automatic transmission for controlling an engine braking torque, and to control a torque generated by said electric motor, for thereby controlling said braking force to be applied to the vehicle, and said target-deceleration-value control portion is operable, in response to an operation of any one of said plurality of deceleration-value setting devices while said braking force is not being controlled by said brake control portion, to set said target deceleration value to an initial value on the basis of a reference deceleration value to be obtained when said first forward-drive shift range of said automatic transmission is selected.

9. The deceleration control apparatus according to claim 1, wherein the vehicle includes a manually operable lever, and said plurality of deceleration-value setting devices include a first deceleration-value setting device operable by said lever to increase and reduce said target deceleration value.

10. The deceleration control apparatus according to claim 9, wherein said lever is located at one of positions of a center console, a floor and an instrument panel of the vehicle.

11. The deceleration control apparatus according to claim 9, wherein the vehicle includes a drive wheel and a transmission operatively connected to said drive wheel, and said lever is a shift lever operable to control a shifting action of said transmission.

12. The deceleration control apparatus according to claim 9, wherein said lever has a deceleration-control-mode selecting position for selecting a deceleration control mode in which said first deceleration-value setting device is operable by an operation of the lever.

13. The deceleration control apparatus according to claim 12, wherein said first deceleration-value setting device includes two switches which are turned on by respective movements of said lever from said deceleration-control-mode selecting position, to respectively increase and reduce said target deceleration value.

14. The deceleration control apparatus according to claim 12, further comprising a deceleration-control-mode selector switch which is turned on to establish said deceleration control mode when said lever is operated to said deceleration-control-mode selecting position.

15. The deceleration control apparatus according to claim 12, wherein said plurality of deceleration-value setting devices includes a second deceleration-value setting device which is operable to increase and reduce said target deceleration value irrespective of whether said deceleration control mode has been selected by operating said lever to said deceleration-control-mode selecting position.

16. The deceleration control apparatus according to claim 1, wherein the vehicle includes a manually operable lever, and said plurality of deceleration-value setting devices includes a second deceleration-value setting device operable irrespective of an operation of said lever to increase and reduce said target deceleration value.

17. The deceleration control apparatus according to claim 16, wherein said second deceleration-value setting device is provided on a steering wheel of the vehicle or located at a position near said steering wheel.

18. The deceleration control apparatus according to claim 1, wherein said brake control portion is operable to calculate a required value of said, braking force to be applied to the vehicle, on the basis of said target deceleration value changed by said target-deceleration-value control portion, and according to a predetermined relationship between said required value and said target deceleration value.

* * * * *